(12) United States Patent
Lee et al.

(10) Patent No.: US 10,386,666 B2
(45) Date of Patent: Aug. 20, 2019

(54) DISPLAY DEVICE WITH SIMPLIFIED APPEARANCE STRUCTURE AND IMPROVED COUPLING ARRANGEMENT

(71) Applicant: LG ELECTRONICS INC., Seoul (KR)

(72) Inventors: Munhe Lee, Seoul (KR); Gyoungbok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/160,590

(22) Filed: Oct. 15, 2018

(65) Prior Publication Data
US 2019/0086710 A1    Mar. 21, 2019

Related U.S. Application Data

(63) Continuation of application No. 15/950,467, filed on Apr. 11, 2018, now Pat. No. 10,120,226, which is a continuation of application No. 15/631,960, filed on Jun. 23, 2017, now Pat. No. 9,971,179, which is a continuation of application No. 14/692,479, filed on Apr. 21, 2015, now Pat. No. 9,709,836.

(30) Foreign Application Priority Data

Oct. 27, 2014    (KR) .................. 10-2014-0145646

(51) Int. Cl.
| | | |
|---|---|---|
| G02F 1/1333 | (2006.01) | |
| F21V 8/00 | (2006.01) | |
| H04N 5/64 | (2006.01) | |
| G06F 1/16 | (2006.01) | |

(52) U.S. Cl.
CPC ....... *G02F 1/133308* (2013.01); *G02B 6/009* (2013.01); *G06F 1/1601* (2013.01); *H04N 5/64* (2013.01); *G02F 2001/13332* (2013.01); *G02F 2001/133314* (2013.01); *G02F 2001/133317* (2013.01); *G02F 2201/465* (2013.01)

(58) Field of Classification Search
CPC ...... G02F 1/133308; G02B 6/009; H04N 5/64
See application file for complete search history.

(56) References Cited

U.S. PATENT DOCUMENTS

| | | |
|---|---|---|
| 9,270,924 B2 | 2/2016 | Shimomichi |
| 9,467,641 B2 | 10/2016 | Shimomichi |
| 2002/0080297 A1 | 6/2002 | Sung |
| 2011/0149198 A1 | 6/2011 | Kim et al. |
| 2014/0233259 A1 | 8/2014 | Jung et al. |

FOREIGN PATENT DOCUMENTS

| | | |
|---|---|---|
| CN | 202904171 U | 4/2013 |
| EP | 2 339 395 A2 | 6/2011 |
| JP | 2014-115313 A | 6/2014 |

*Primary Examiner* — Jospeh L Williams
(74) *Attorney, Agent, or Firm* — Birch, Stewart, Kolasch & Birch, LLP

(57) ABSTRACT

A display apparatus including a display panel to display an image; a cabinet covering a front edge portion of the display panel; a light source package disposed on a rear side of the display panel to provide light onto the display panel; a bottom cover disposed on a rear side of the light source package, the bottom cover being coupled to the cabinet to package the display panel and the light source package; and a back cover covering a first portion of a rear side of the bottom cover.

18 Claims, 31 Drawing Sheets

DISPLAY DEVICE WITH SIMPLIFIED APPEARANCE STRUCTURE AND IMPROVED COUPLING ARRANGEMENT

CROSS-REFERENCE TO RELATED APPLICATIONS

This application is a Continuation of co-pending U.S. patent application Ser. No. 15/950,467 filed on Apr. 11, 2018, which is a Continuation of U.S. patent application Ser. No. 15/631,960 filed on Jun. 23, 2017 (now U.S. Pat. No. 9,971,179 issued on May 15, 2018), which is a Continuation of U.S. patent application Ser. No. 14/692,479 filed on Apr. 21, 2015 (now U.S. Pat. No. 9,709,836 issued on Jul. 18, 2017), which claims the priority benefit under 35 U.S.C. § 119(a) to Korean Patent Application No. 10-2014-0145646 filed in the Republic of Korea on Oct. 27, 2014, all of which are hereby expressly incorporated by reference into the present application.

BACKGROUND OF THE INVENTION

Field of the Invention

The present invention relates to a display apparatus.

Discussion of the Related Art

Display apparatuses may be apparatuses for visually displaying images such as televisions or monitors. In recent years, liquid crystal display apparatuses as flat panel displays have formed a majority of display apparatuses in the market.

A display apparatus according to the related art is disclosed in Korean Patent Publication No. 10-2006-0046481. The display apparatus disclosed in Korean Patent Publication No. 10-2006-0046481 is manufactured through an assembly process in which a display panel and a backlight unit are packaged with a space between a front cover and a bottom cover to mount a back cover on a rear side of the bottom cover. Here, the covers may be coupled by using a plurality of assembly components for assembling and a plurality of screw members for screw-coupling.

However, in the display apparatus according to the related art, the number of assembly components required for performing the assembly process is many and complicated. Further, the plurality of screw members may deteriorate efficiency in the assembly process.

Also, due to the complicated assembly process and the use of the plurality of assembly components required for performing the assembly process with the plurality of screw members, manufacturing costs rise.

SUMMARY OF THE INVENTION

Embodiments provide a display apparatus having a simple structure for improving assembly process efficiency and reducing manufacturing costs.

In one embodiment, a display apparatus includes: a cabinet; a display panel disposed on a rear side of the cabinet to display an image toward a front side of the cabinet; a backlight unit disposed on a rear side of the display panel to provide light onto the display panel; a bottom cover disposed on a rear side of the backlight unit, the bottom cover being coupled to the cabinet to package the display panel and the backlight unit; a main board disposed on a rear side of the bottom cover, the main board being disposed away from a center of a back surface of the bottom cover; and a back cover covering the main board, the back cover being coupled to the bottom cover to partially cover the bottom cover.

The main board may be disposed adjacent to a lower edge of the bottom cover, and the back cover may cover a lower portion of the back surface of the bottom cover.

The cabinet may be hook-coupled to each of the bottom cover and the back cover.

At least one latch protrusion for hook-coupling may be disposed on the cabinet, and at least one latch hole in which the at least one latch protrusion is inserted may be defined in each of the bottom cover and the back cover.

The latch protrusion may be provided in plurality, and the plurality of latch protrusions may be spaced a predetermined distance from each other along an edge of the cabinet.

The latch hole of the bottom cover may be provided in plurality, and the plurality of latch holes of the bottom cover may be defined to correspond to the latch protrusions disposed on the upper edge and both edges of the cabinet.

A plurality of latch guide grooves defined in a front side of the plurality of latch holes to guide the insertion of the plurality of latch protrusions may be defined in the bottom cover.

The latch hole of the back cover may be provided in plurality, and the plurality of latch holes of the back cover may be defined to correspond to the latch protrusions disposed on the lower edge of the cabinet.

At least one fitting rib spaced a predetermined distance from the edge of the cabinet and protruding from the back surface of the cabinet so as to be fitted into the back cover may be disposed on the cabinet.

The fitting rib may be provided in plurality, and the plurality of fitting ribs may be disposed to be spaced a predetermined distance from each other along the edge of the cabinet.

The fitting ribs protruding from an upper portion and both side portions of the back surface of the cabinet may be fitted into the bottom cover, and the fitting ribs protruding from a lower portion of the back surface of the cabinet may be fitted into the back cover.

At least one latch rib latch-coupled to the bottom cover may protrude from the cabinet.

The latch rib may be provided in a pair, and the pair of latch ribs may protrude from the lower portion of the back surface of the cabinet and be spaced a predetermined distance from each other.

The display apparatus may further include a board support mounted on the back surface of the bottom cover on which the main board is mounted.

The back cover may be hook-coupled to the board support.

At least one hook protrusion hook-coupled to the board support may be disposed on the back cover, and at least one hook mount hook-coupled to the at least one hook protrusion may be disposed on the board support.

The hook protrusion may be provided in plurality, and the plurality of hook protrusions may be disposed to be spaced a predetermined distance from each other along an upper edge of the back cover.

The at least one hook mount may be provided in plurality, and the plurality of hook mounts may be spaced a predetermined distance from each other on a top surface of the board support to correspond to the plurality of hook protrusions.

At least one back cover rib spaced a predetermined distance from the edge of the back cover and protruding from a front surface of the back cover so as to be fitted into the board support may be disposed on the back cover.

The back cover rib may be provided in plurality, and the plurality of back cover ribs may be disposed to be spaced a predetermined distance from each other along the edge of the back cover.

The details of one or more embodiments are set forth in the accompanying drawings and the description below. Other features will be apparent from the description and drawings, and from the claims.

DETAILED DESCRIPTION OF THE EMBODIMENTS

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

A display apparatus includes a display for visually displaying an image. The display apparatus may include various apparatuses for displaying an image such as televisions, monitors, laptop PCs, Tablet PCs, Smartphones, personal digital assistants, E-book readers, electronic picture frames, kiosks, and the like. Hereinafter, a monitor will be described as an example of the display apparatus according to an embodiment.

Figure 1:
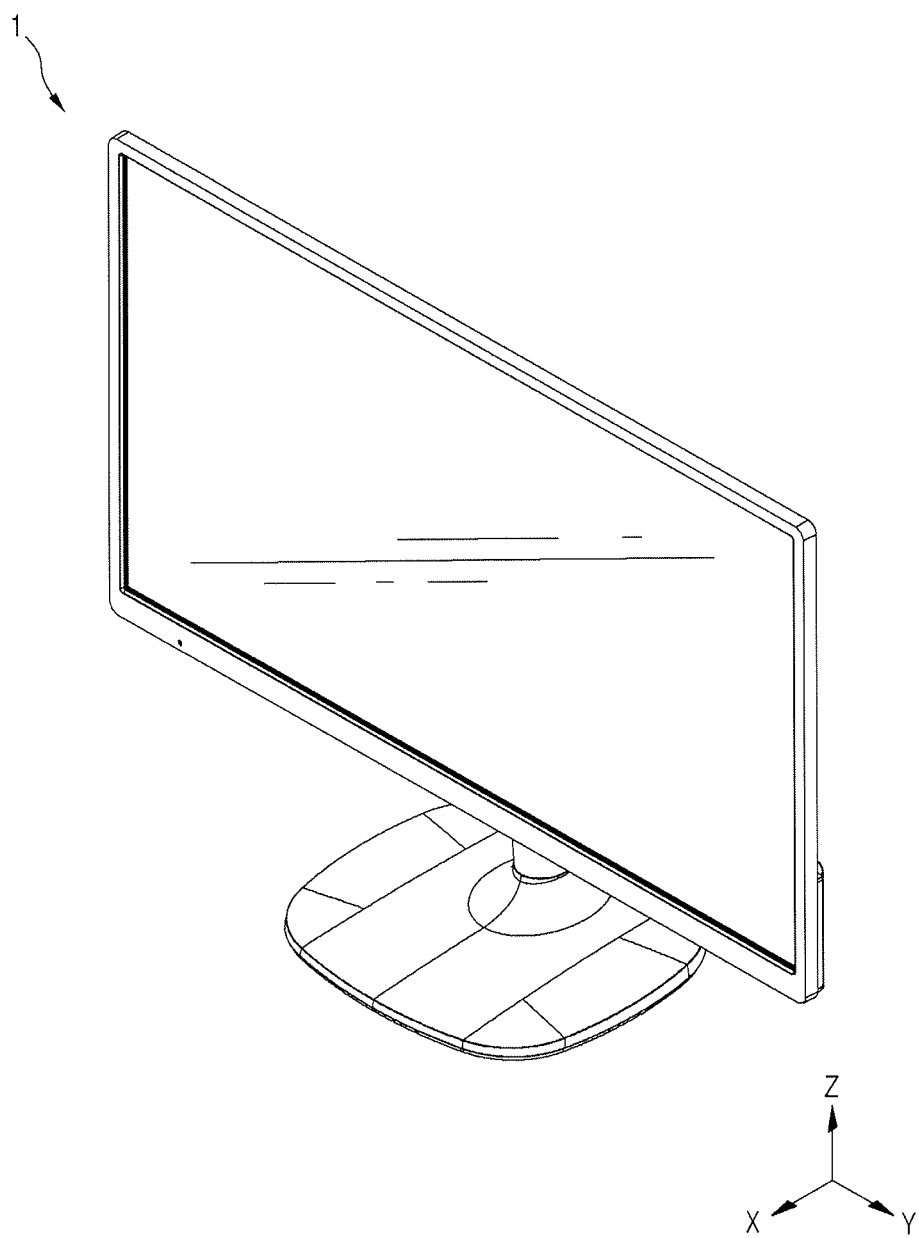
FIG. 1 is a perspective view of a display apparatus according to an embodiment.
Figure 2:
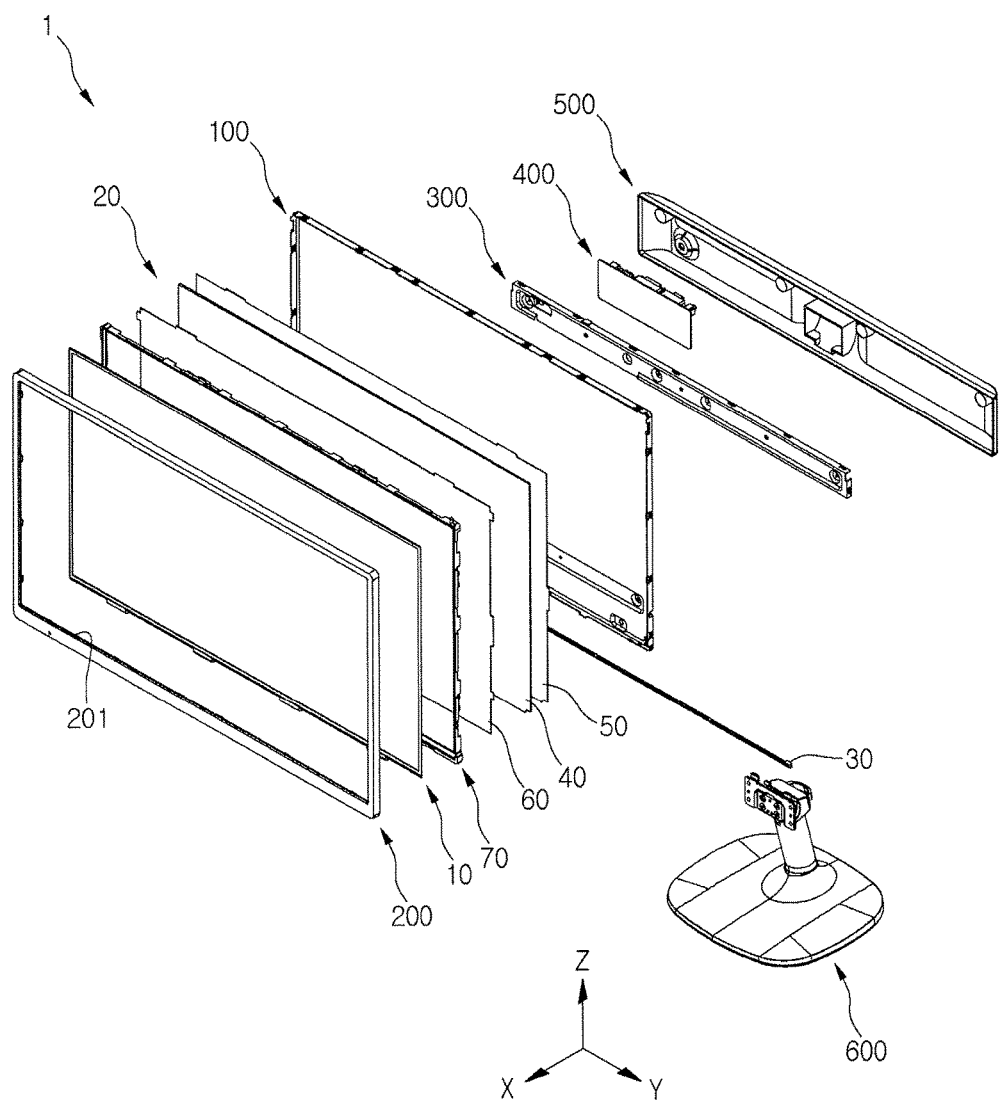
FIG. 2 is an exploded perspective view of the display apparatus of FIG. 1.

FIG. 1 is a perspective view of a display apparatus according to an embodiment, and FIG. 2 is an exploded perspective view of the display apparatus of FIG. 1.

Referring to FIGS. 1 and 2, a display apparatus 1 includes a display panel 10, a backlight unit 20, a panel guide 70, a bottom cover 100, a cabinet 200, a board support 300, a main board 400, a back cover 500, and a stand 600.

The display panel 10 may display an image and be provided with a liquid crystal display panel. Since the liquid crystal display panel is well known, its detailed description will be omitted herein.

The backlight unit 20 provides light onto the display panel 10 to allow the display panel 10 to display an image. The backlight unit 20 is disposed on a rear side of the display panel 10. The backlight unit 20 includes a light source package 30, a light guide plate 40, and an optical sheet 60.

The light source package 30 may supply light onto the display panel 10. The light source package 30 is mounted on one side of the bottom cover 100. The light source package 30 may be classified as an edge type light source package that is disposed on a lateral surface or a direct type light source package that is disposed on the bottom according to their placed positions. Hereinafter, in the current embodiment, the edge type light source package may be exemplified.

The light guide plate 40 converts light emitted from the light source package 30 into a surface light source to guide the surface light source onto the display panel 10. Since the light guide plate 40 is well known, its detailed description will be omitted herein.

The reflection plate 50 may allow lost light emitted from the light guide plate 40 toward a side opposite to the display panel 10 to be re-incident into the light guide plate 40. Since the reflection plate 50 is well known, its detailed description will be omitted herein.

The optical sheet 60 may uniformly diffuse the light emitted from the light guide plate 40 to improve brightness. The optical sheet 60 may be a diffusion sheet and provided in plurality. When the optical sheet 60 is provided in plurality, the optical sheet 60 may include a prism sheet. Since the optical sheet 60 is well known, its detailed description will be omitted herein.

The panel guide 70 guides mounting of the display panel 10 on the bottom cover 100 and is disposed between display panel 10 and the optical sheet 60. The panel guide 70 is inserted into an inner surface of the bottom cover 100 and then mounted on the bottom cover 100.

The bottom cover 100 accommodates various components constituting the display apparatus 1. The bottom cover 100 is coupled to the cabinet 200 disposed on a front side of the bottom cover 100 that will be described later to package the display panel 10 and the backlight unit 20.

Also, the bottom cover 100 may be formed of a metal material, and an exterior of the bottom cover 100 may be color-coated. As to be described below, the display apparatus 1 according to the current embodiment may be exposed to the outside through a portion of the exterior of the bottom cover 100. Here, the display apparatus 1 may secure an elegant design in view of design through the bottom cover 100 formed of a metal material that is color-coated. Hereinafter, specific constitutions of the bottom cover 100 will be described in detail with reference to descriptions of an assembly process that will be described later.

The cabinet 200 defines a front edge of the display apparatus 1 and has a front opening 201 through which the displayed image is output from the display panel 10. Hereinafter, specific constitutions of the cabinet 200 will be described in detail with reference to the descriptions of the assembly process that will be described later.

The board support 300 guides mounting of the main board 400 and the back cover 500. Also, the board support 300 is mounted on the bottom cover 100 on a rear side of the bottom cover 100. The board support 300 may be formed of a metal material having a long bar shape. The board support 300 may reinforce stiffness of the display apparatus 1. Hereinafter, specific constitutions of the board support 300 will be described in detail with reference to the descriptions of the assembly process that will be described later.

The main board 400 may control the display apparatus 1 and supply power to the display apparatus 1. That is, the main board 400 according to the current embodiment may be provided as one main board 400 for controlling the display apparatus 1 and supplying power to the display apparatus 1. The main board 400 is mounted on the board support 300 on a rear side of the bottom cover 100. Here, the main board 400 may be disposed to get out of a center of a back surface (see reference numeral 102 of FIG. 16) of the bottom cover 100. In other words, the main board 400 may be disposed away from a center of a back surface of the bottom cover 100 (e.g., positioned along the bottom edge). Hereinafter, specific constitutions of the main board 400 will be described in detail with reference to the descriptions of the assembly process that will be described later.

The back cover 500 covers the main board 400. Also, the back cover 500 may be coupled to the bottom cover 100 in a state where the back cover 500 partially covers the bottom cover 100. Particularly, the back cover 500 may be coupled to the bottom cover 100 in a state where the back cover 500 covers a lower portion of the back surface (see reference numeral 102 of FIG. 16) of the bottom cover 100. This is done because the main board 400 is disposed at a position that gets out of the center of the back surface (see reference numeral 102 of FIG. 16) of the bottom cover 100, particularly, at a position that is adjacent to a lower edge of the back surface 102 of the bottom cover 100.

In the current embodiment, the back cover 500 may not cover an entire back surface of the bottom cover 100, but cover a portion of the back surface 102 of the bottom cover 100. Thus, the back cover 500 may be reduced in size. As the back cover 500 is reduced in size, costs for manufacturing the back cover 500 may be reduced by the reduced size of the back cover 500 in the current embodiment.

Also, the back cover 500 is formed of a metal material. Thus, the display apparatus 1 may secure an elegant design in view of design through the back cover 500 formed of the meal material. Hereinafter, specific constitutions of the back cover 500 will be described in detail with reference to the descriptions of the assembly process that will be described later.

The stand 600 may support the display apparatus 1. The stand 600 may be mounted on the bottom cover 100 on a rear side of the back cover 500. The stand 600 may be a ground stand or a wall mount stand. Hereinafter, in the current embodiment, the ground stand will be exemplified.

Hereinafter, an assembly process of the display apparatus 1 according to the current embodiment will be described in detail.

Figure 3:
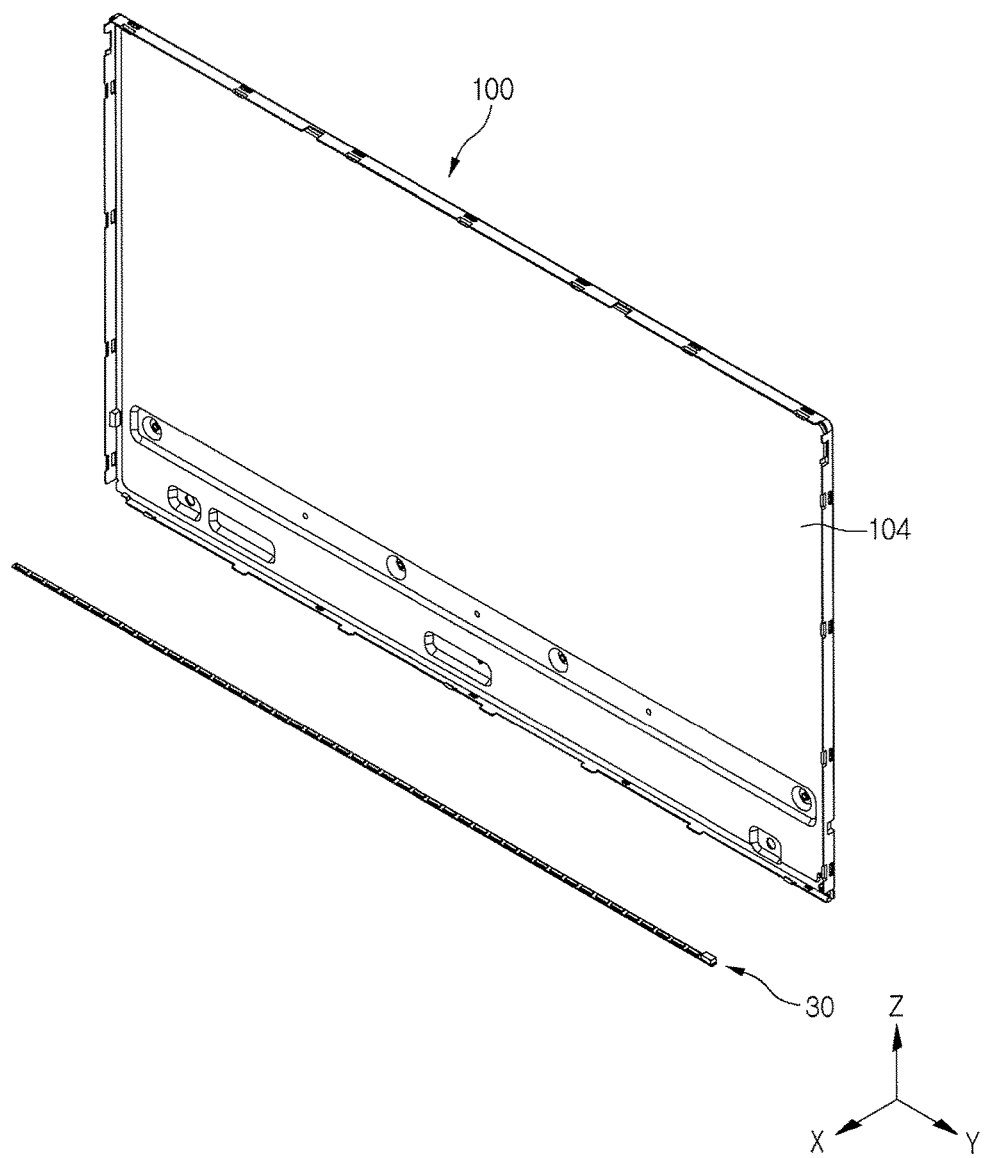
FIG. 3 is a view illustrating an assembly process of a bottom cover and a light source assembly of FIG. 2.
Figure 4:
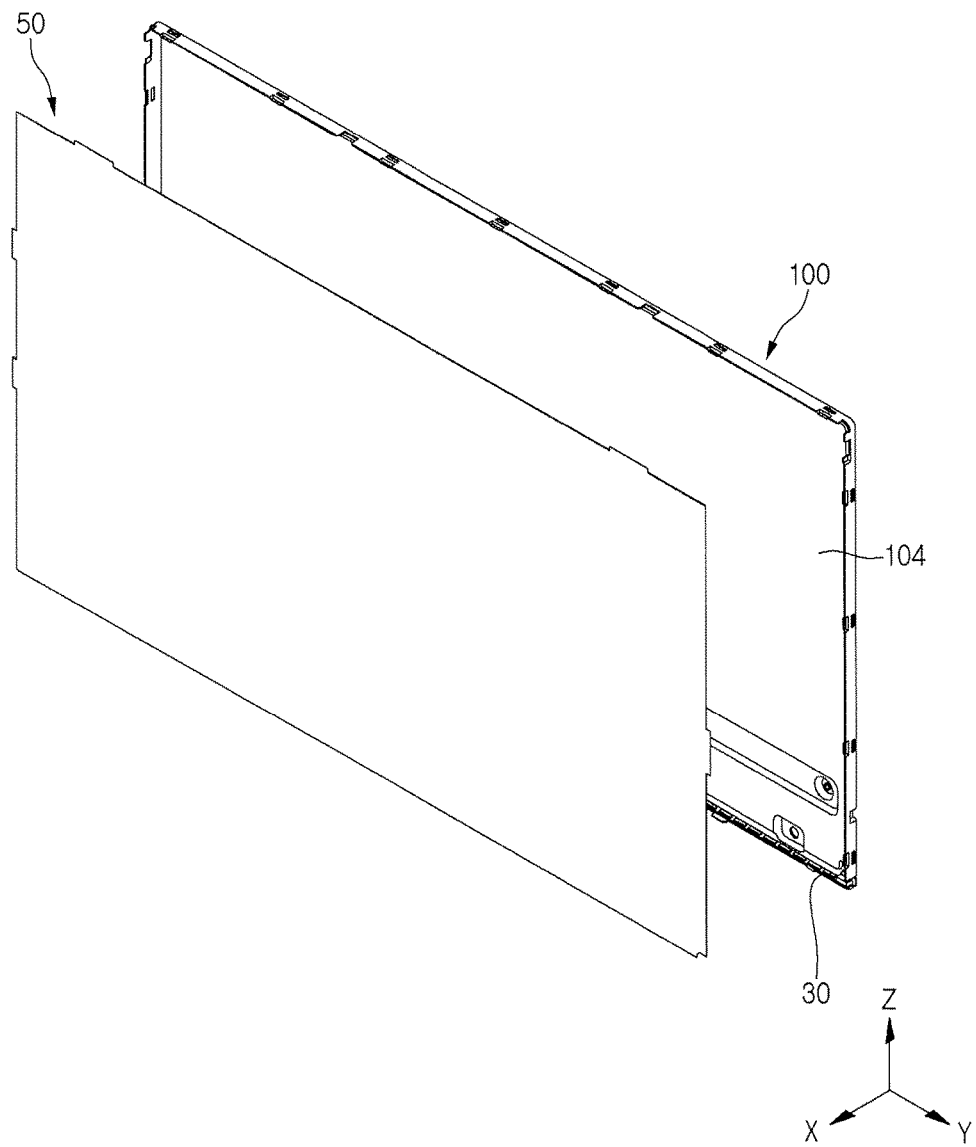
FIG. 4 is a view illustrating an assembly process of the bottom cover on which the light source assembly of FIG. 3 is mounted and a reflection plate of FIG. 2.
Figure 5:
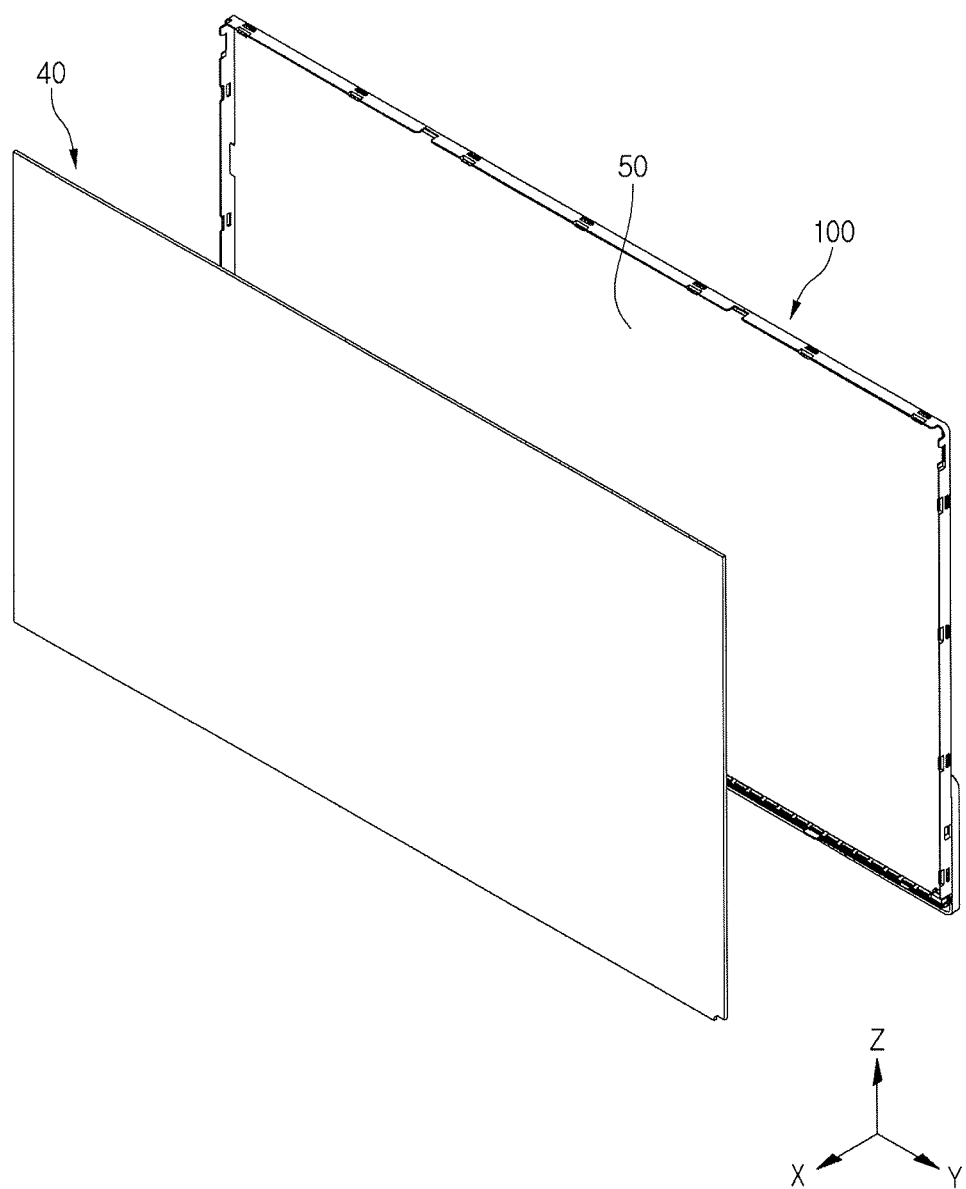
FIG. 5 is a view illustrating an assembly process of the bottom cover on which the reflection plate of FIG. 4 is mounted and a light guide plate of FIG. 2.
Figure 6:
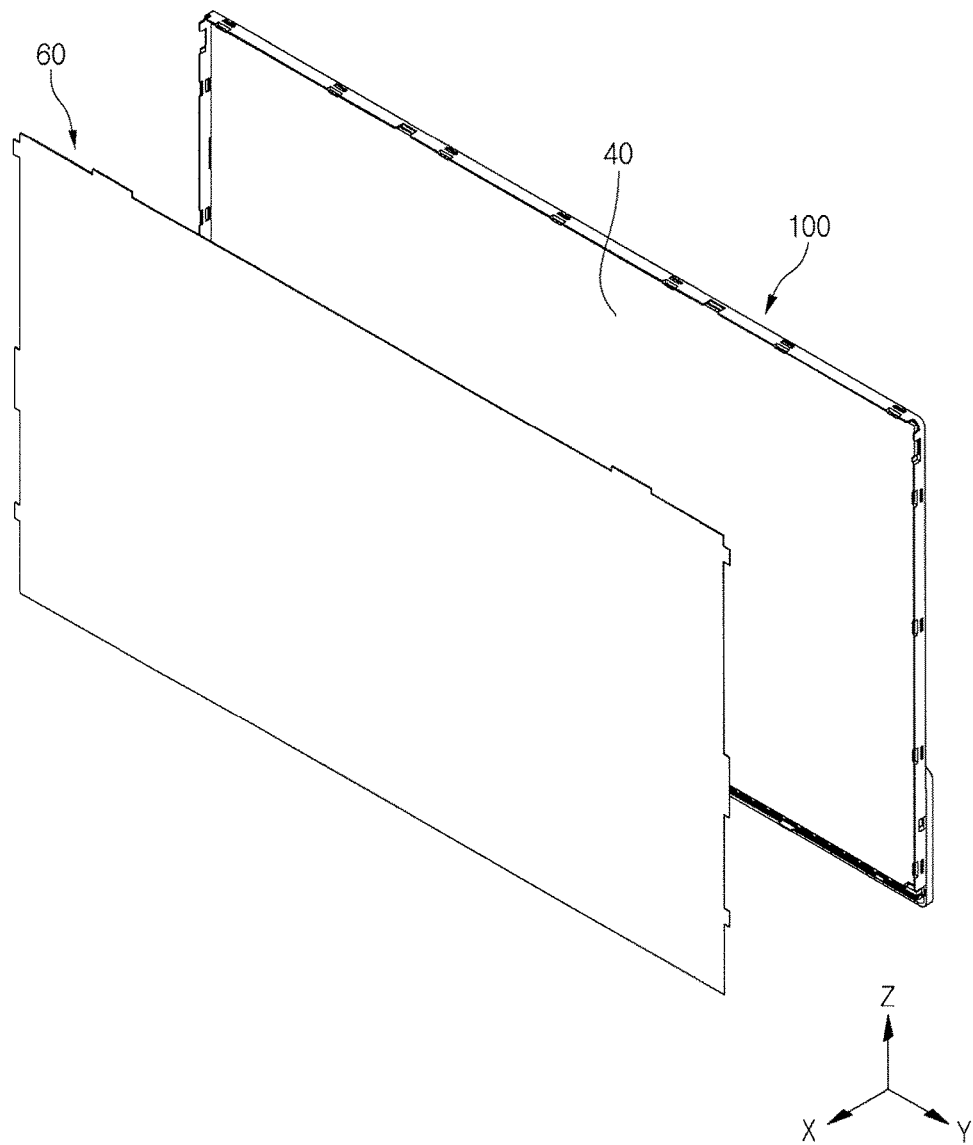
FIG. 6 is a view illustrating an assembly process of the bottom cover on which the light guide plate of FIG. 5 is mounted and an optical sheet of FIG. 2.
Figure 7:
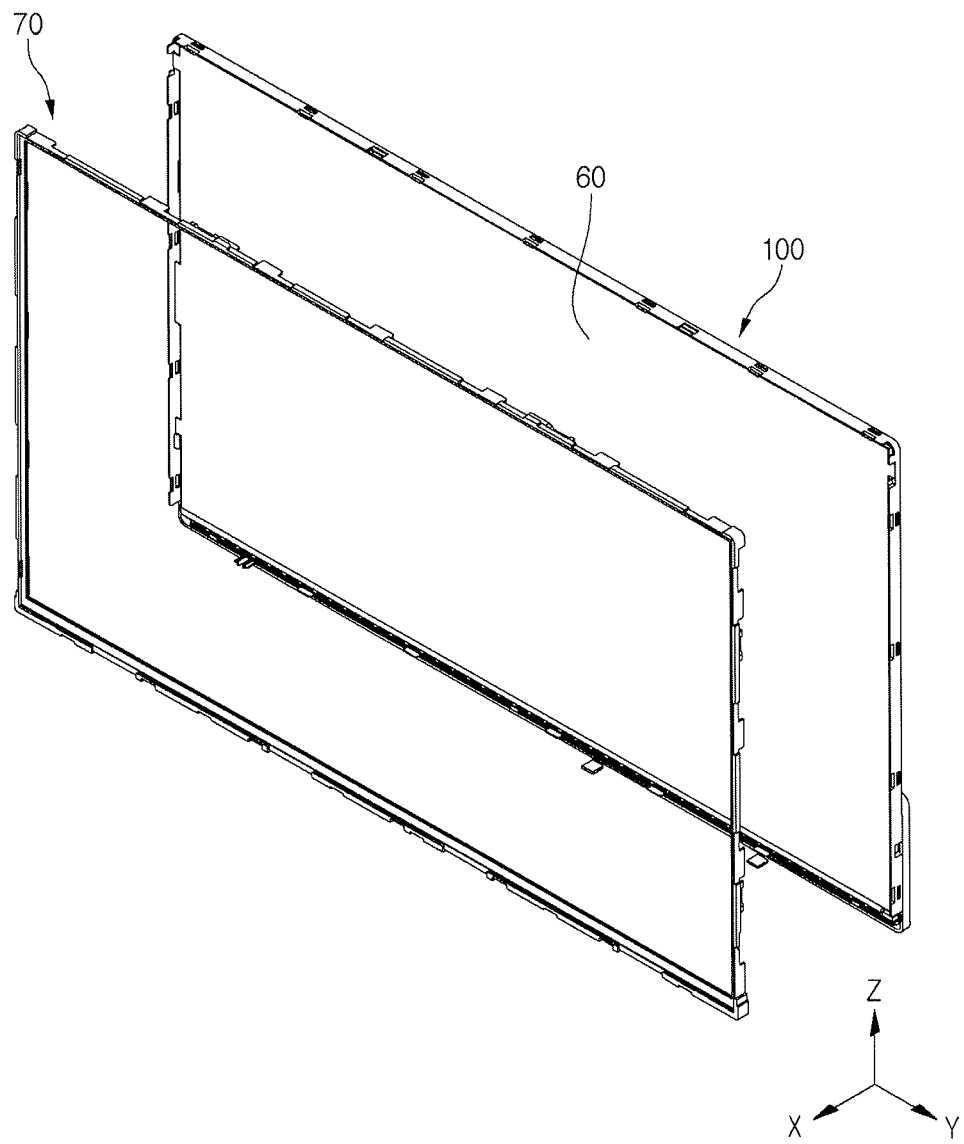
FIG. 7 is a view illustrating an assembly process of the bottom cover on which the optical sheet of FIG. 6 is mounted and a panel guide of FIG. 2.
Figure 8:
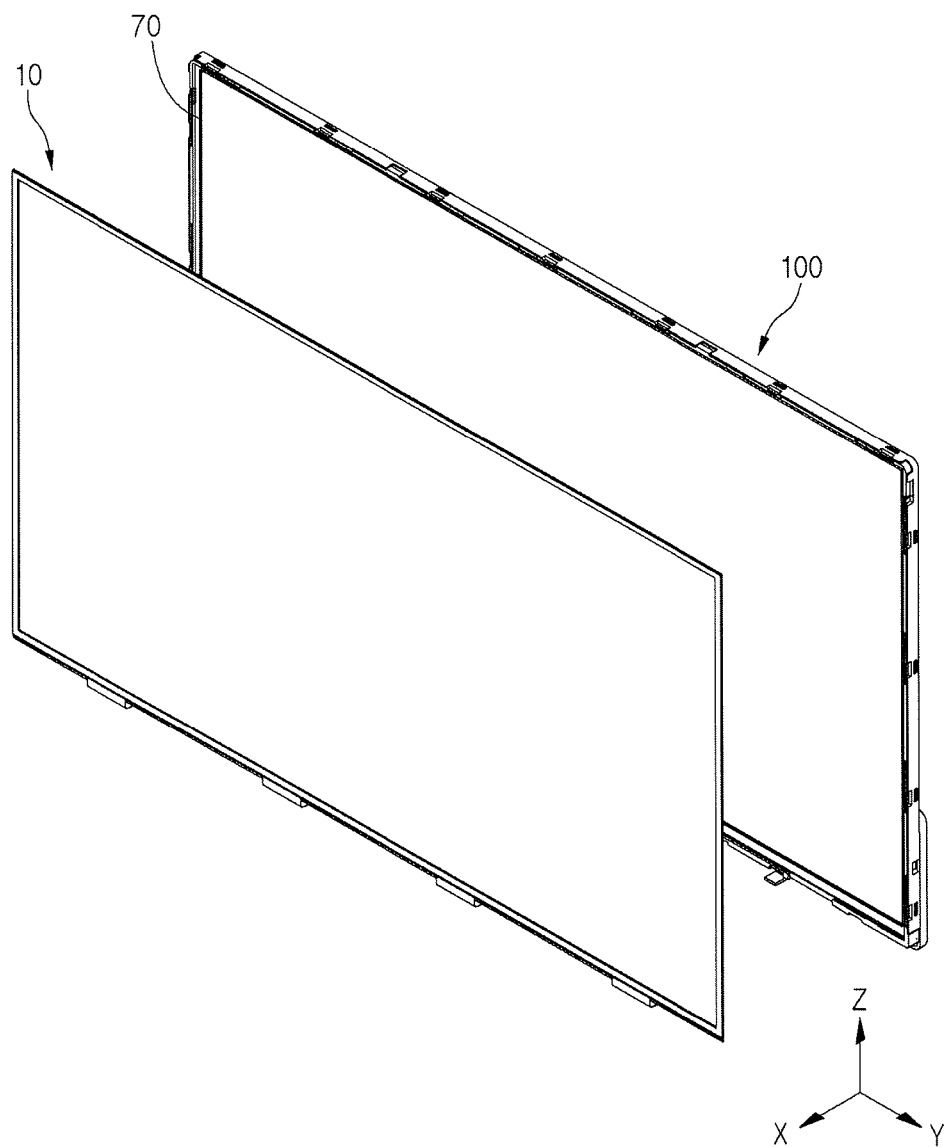
FIG. 8 is a view illustrating an assembly process of the bottom cover on which panel guide of FIG. 7 is mounted and a display panel of FIG. 2.

FIG. 3 is a view illustrating an assembly process of the bottom cover and the light source assembly of FIG. 2, FIG. 4 is a view illustrating an assembly process of the bottom cover on which the light source assembly of FIG. 3 is mounted and the reflection plate of FIG. 2, FIG. 5 is a view illustrating an assembly process of the bottom cover on which the reflection plate of FIG. 4 is mounted and the light guide plate of FIG. 2, FIG. 6 is a view illustrating an assembly process of the bottom cover on which the light guide plate of FIG. 5 is mounted and the optical sheet of FIG. 2, FIG. 7 is a view illustrating an assembly process of the bottom cover on which the optical sheet of FIG. 6 is mounted and the panel guide of FIG. 2, and FIG. 8 is a view illustrating an assembly process of the bottom cover on which panel guide of FIG. 7 is mounted and the display panel of FIG. 2.

Referring to FIGS. 3 to 8, a light source package 30 is mounted on one side of an inner surface 104 of a bottom cover 100. Thereafter, a reflection plate 50 is mounted on a front side of the inner surface of the bottom cover on which the light source package 30 is mounted, and a light guide plate 40 is mounted on a front side of the reflection plate 50. Also, an optical sheet 60 is mounted on a front side of the bottom cover 100 on which the light guide plate 40 is mounted, and a panel guide 70 is inserted into the bottom cover 100 on a front side of the optical sheet 50. Then, a display panel 10 is mounted on a front side of the bottom cover on which the panel guide is mounted.

Figure 9:
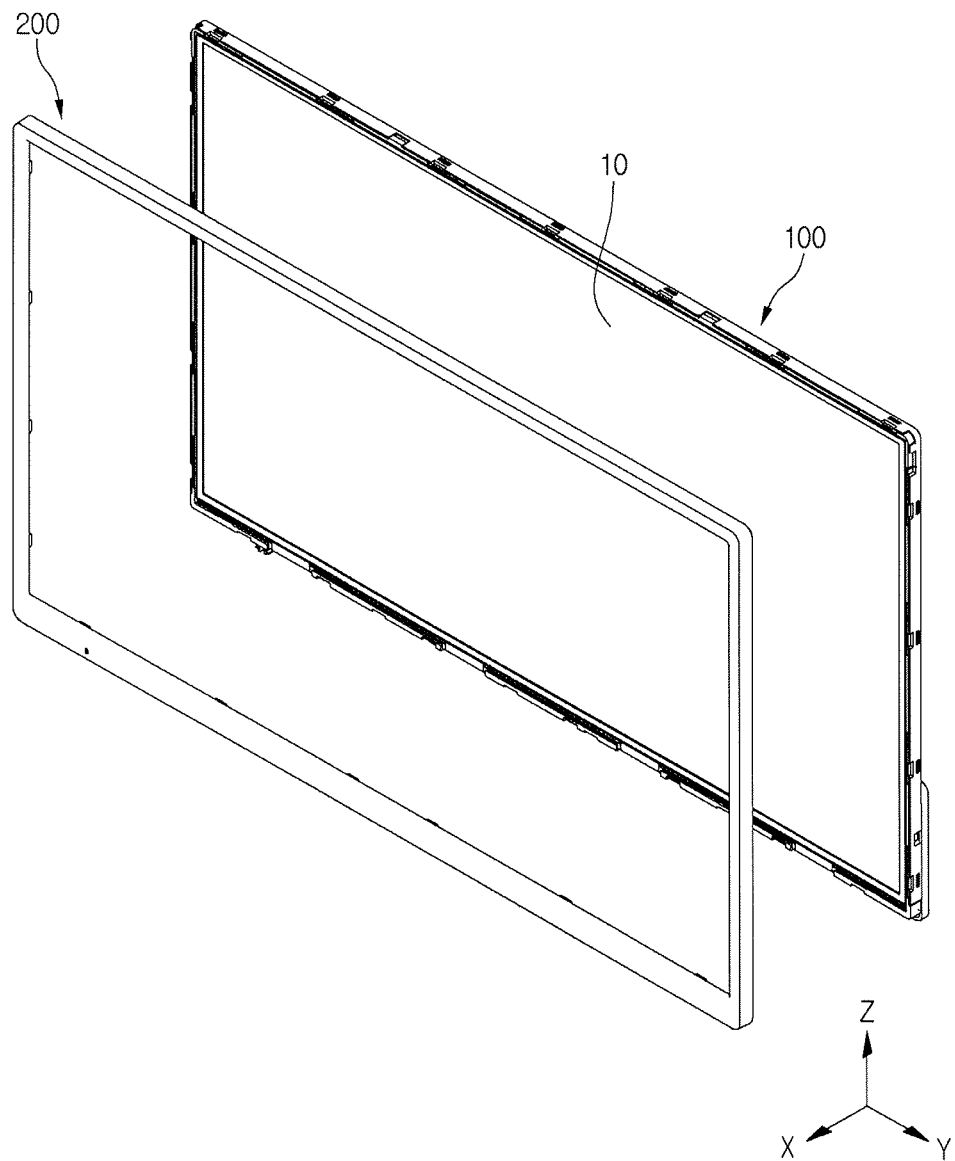
FIG. 9 is a view illustrating an assembly process of the bottom cover on which the display panel of FIG. 8 is mounted and a cabinet of FIG. 2.
Figure 10:
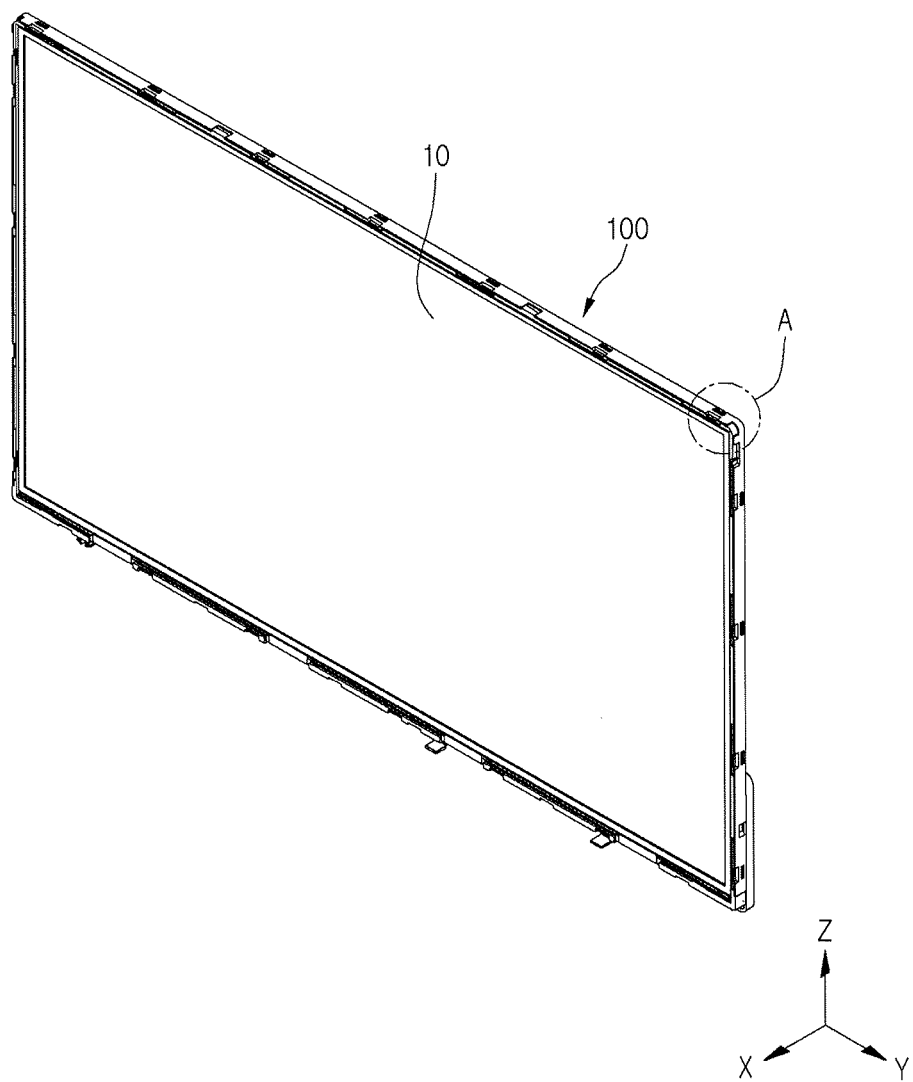
FIG. 10 is a front perspective view of the bottom cover on which the display panel of FIG. 8 is mounted.
Figure 11:
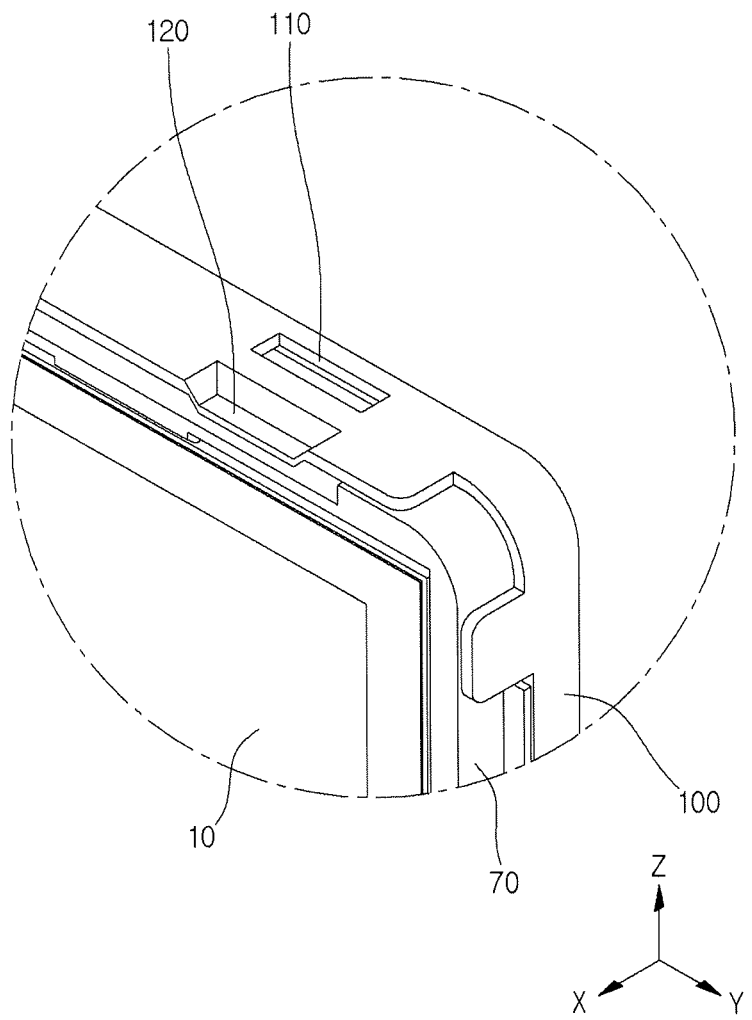
FIG. 11 is an enlarged view illustrating a portion "A" of the bottom cover of FIG. 10.
Figure 12:
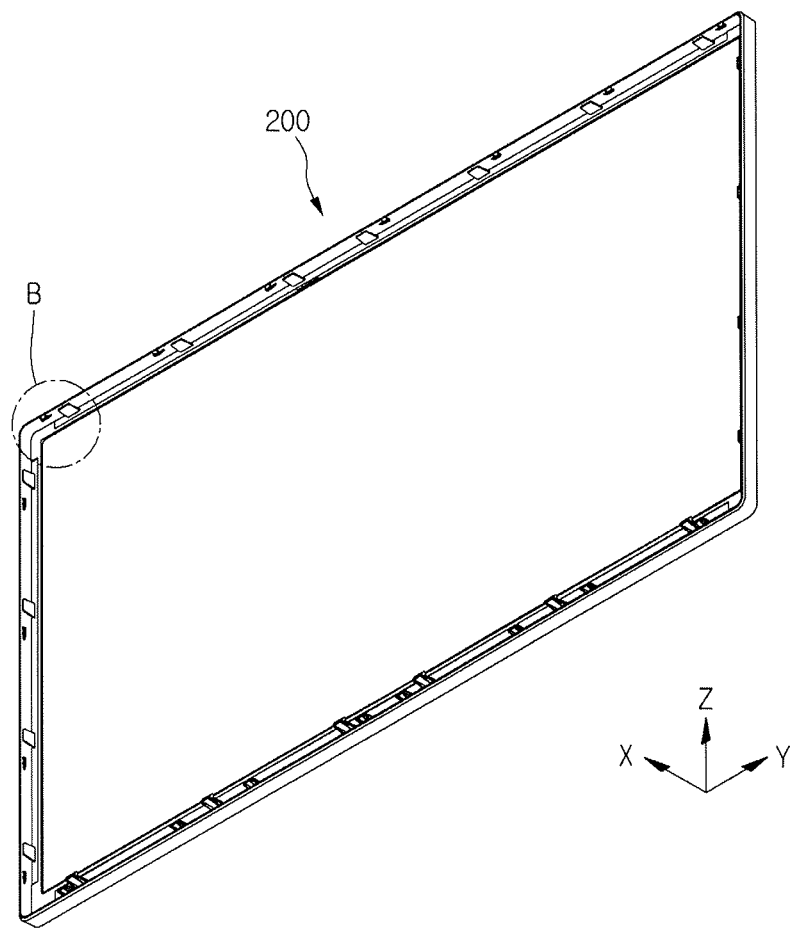
FIG. 12 is a rear perspective view of the cabinet of FIG. 2.
Figure 13:
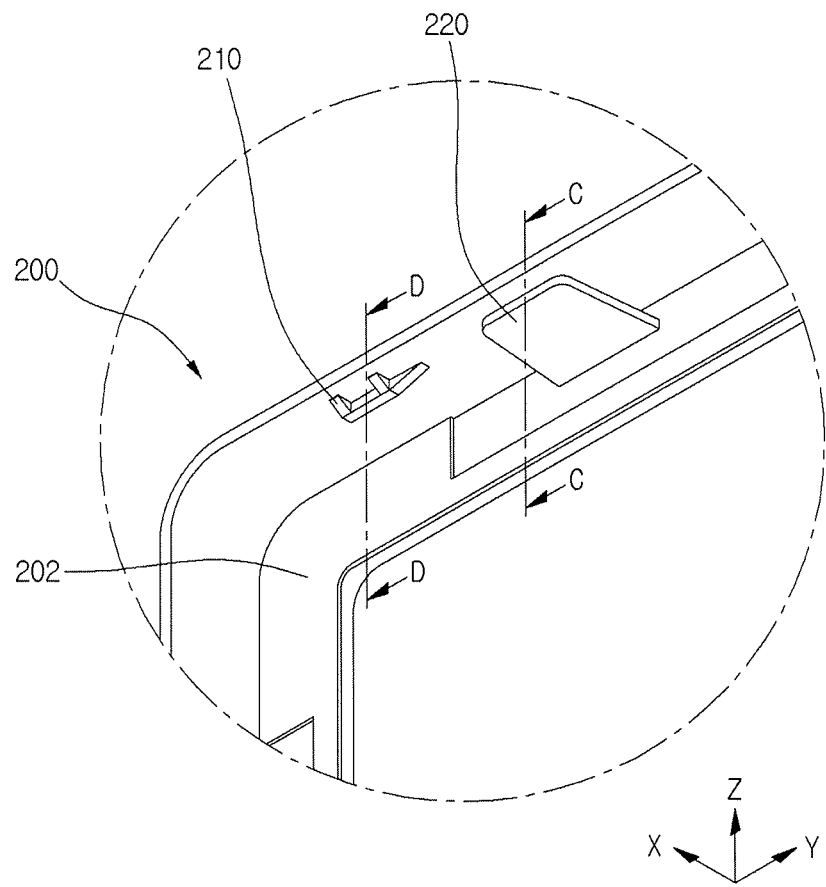
FIG. 13 is an enlarged view illustrating a portion "B" of the cabinet of FIG. 12.
Figure 14:
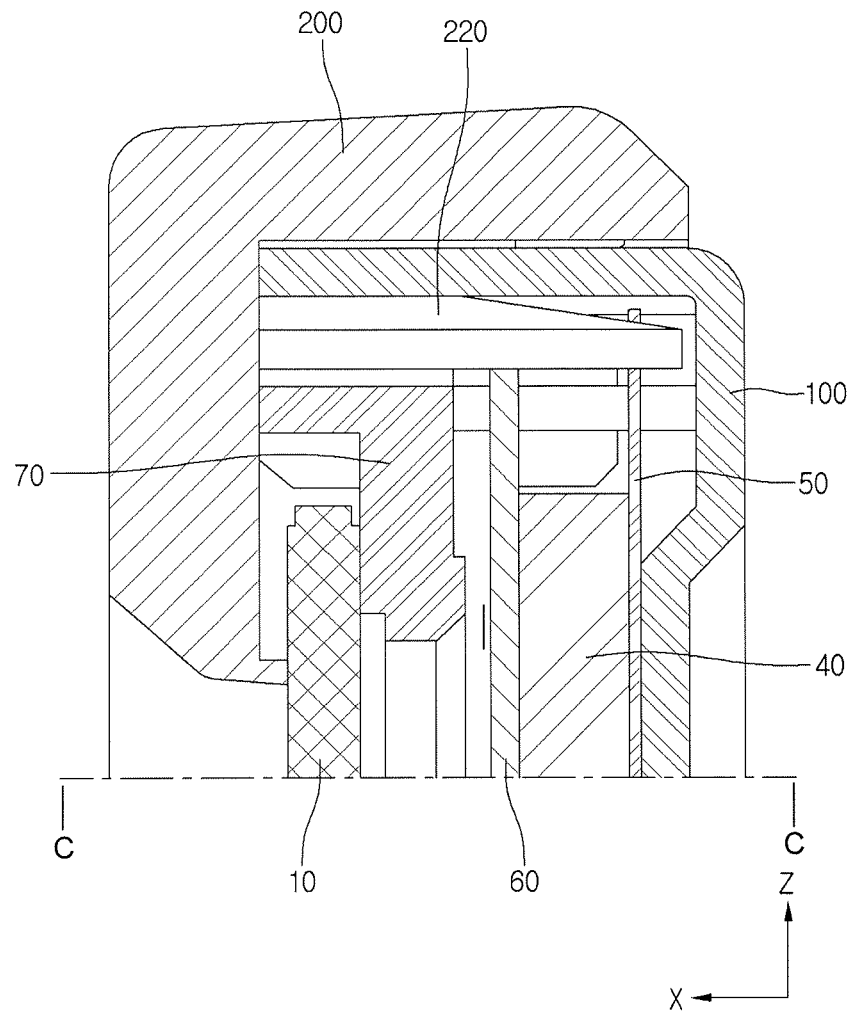
FIG. 14 is a cross-sectional view taken along line "C-C" of FIG. 13 after the bottom cover on which the display panel of FIG. 8 is mounted and the cabinet of FIG. 2 are assembled with each other.
Figure 15:
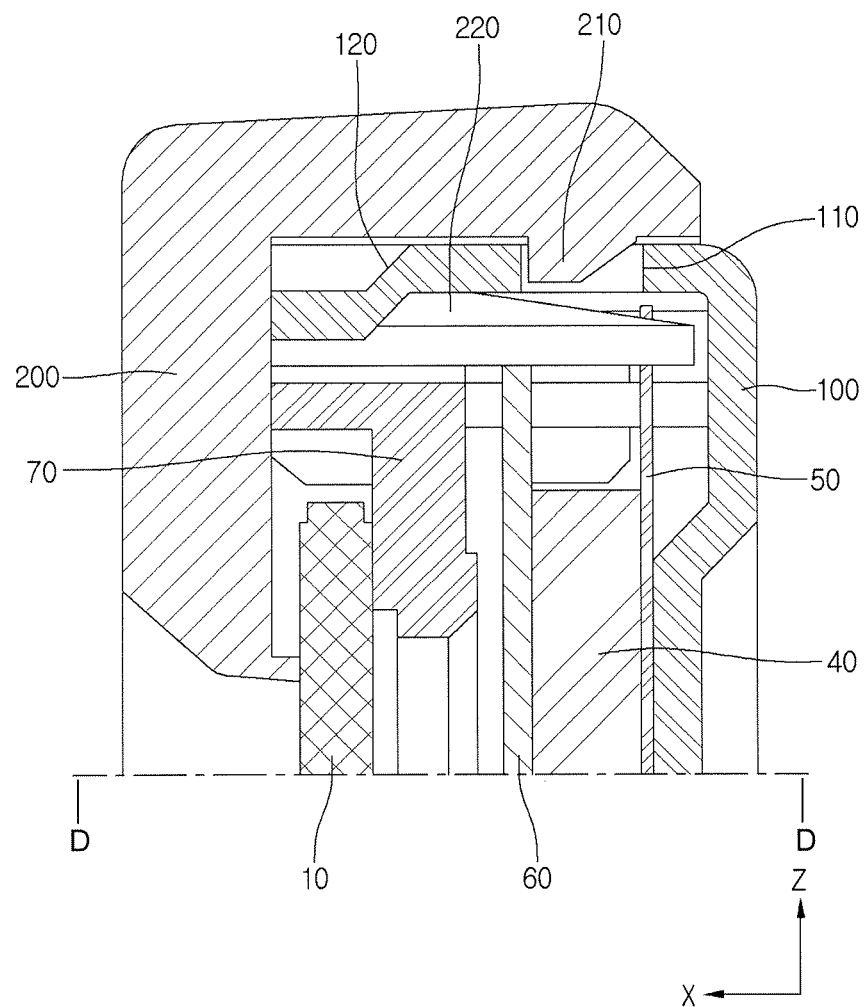
FIG. 15 is a cross-sectional view taken along line "D-D" of FIG. 13 after the bottom cover on which the display panel of FIG. 8 is mounted and the cabinet of FIG. 2 are assembled with each other.

FIG. 9 is a view illustrating an assembly process of the bottom cover on which the display panel of FIG. 8 is mounted and the cabinet of FIG. 2, FIG. 10 is a front perspective view of the bottom cover on which the display panel of FIG. 8 is mounted, FIG. 11 is an enlarged view illustrating a portion "A" of the bottom cover of FIG. 10, FIG. 12 is a rear perspective view of the cabinet of FIG. 2, FIG. 13 is an enlarged view illustrating a portion "B" of the cabinet of FIG. 12, FIG. 14 is a cross-sectional view taken along line "C-C" of FIG. 13 after the bottom cover on which the display panel of FIG. 8 is mounted and the cabinet of FIG. 2 are assembled with each other, and FIG. 15 is a cross-sectional view taken along line "D-D" of FIG. 13 after the bottom cover on which the display panel of FIG. 8 is mounted and the cabinet of FIG. 2 are assembled with each other.

Referring to FIGS. 9 to 15, a cabinet 200 is mounted on a front side of the bottom cover 100 on which the display panel 10 is mounted. Here, the bottom cover 100 and the cabinet 200 may be mounted through hook coupling with respect to each other. Hereinafter, specific components for the hook coupling between the bottom cover 100 and the cabinet 200 will be described.

The bottom cover 100 has a latch hole 110 and a latch guide groove 120.

The latch hole 110 is provided in plurality, and the plurality of latch holes 110 are defined in an upper edge and both side edges of the bottom cover 100. Each of the latch holes 110 may be spaced a predetermined distance from each other, and a latch protrusion 210 of the cabinet 200 that will be described later is fitted into the latch hole 110.

The latch guide groove 120 is defined in a front side of the latch hole 110 and is provided in plurality, like the latch hole 110. The plurality of latch guide grooves 120 may also be defined in an upper edge and both side edges of the bottom cover 100 and be spaced a predetermined distance from each other. The latch guide groove 120 may guide the smooth insertion of the latch protrusion 210 when the latch protrusion 210 of the cabinet 200 is fitted into the latch hole 110.

The cabinet 200 includes the latch protrusion 210 and a fitting rib 220.

The latch protrusion 210 is provided in plurality, and the plurality of latch protrusions 210 are spaced a predetermined distance from each other along an edge of the cabinet 200. Among the plurality of latch protrusions 210, the latch protrusions 210 disposed on the upper edge and both side edges of the cabinet 200 are fitted into the latch holes 110 of the bottom cover 100, and the latch protrusions 210 disposed on the lower edge of the cabinet 200 are fitted into the back cover 500 as described below.

The fitting rib 220 protrudes from a back surface 202 of the cabinet 200 and is provided in plurality. The fitting ribs 220 are disposed to be spaced a predetermined distance from each other along the edge of the cabinet 200. Among the plurality of fitting ribs 220, the fitting ribs 220 disposed in the vicinity of the upper and both side edges of the cabinet 200, i.e., upper and both sides of the back surface 202 of the cabinet 200 are fitted into the bottom cover 100, and the fitting ribs 220 disposed in the vicinity of the lower edge of the cabinet 200, i.e., a lower side of the back surface 202 of the cabinet 200 are fitted into the back cover 500 as described below.

As described above, since the bottom cover 100 and the cabinet 200 are coupled to each other through the hook coupling in the current embodiment, additional components such as a plurality of separate screw members may not be needed.

Thus, the display apparatus (see reference numeral 1 of FIG. 1) according to the current embodiment may improve assembly process efficiency and reduce manufacturing cost.

The bottom cover 100 coupled to the cabinet 200 that packages the display panel 10 and the backlight unit 20 may be provided as a half-finished module. Thus, the half-finished module may be manufactured and then be supplied into a global production base in the foreign country. Then, the following assembly process may be performed to manufacture a final product.

Hereinafter, the assembly process of the display apparatus 1 according to the current embodiment will be continuously described.

Figure 16:
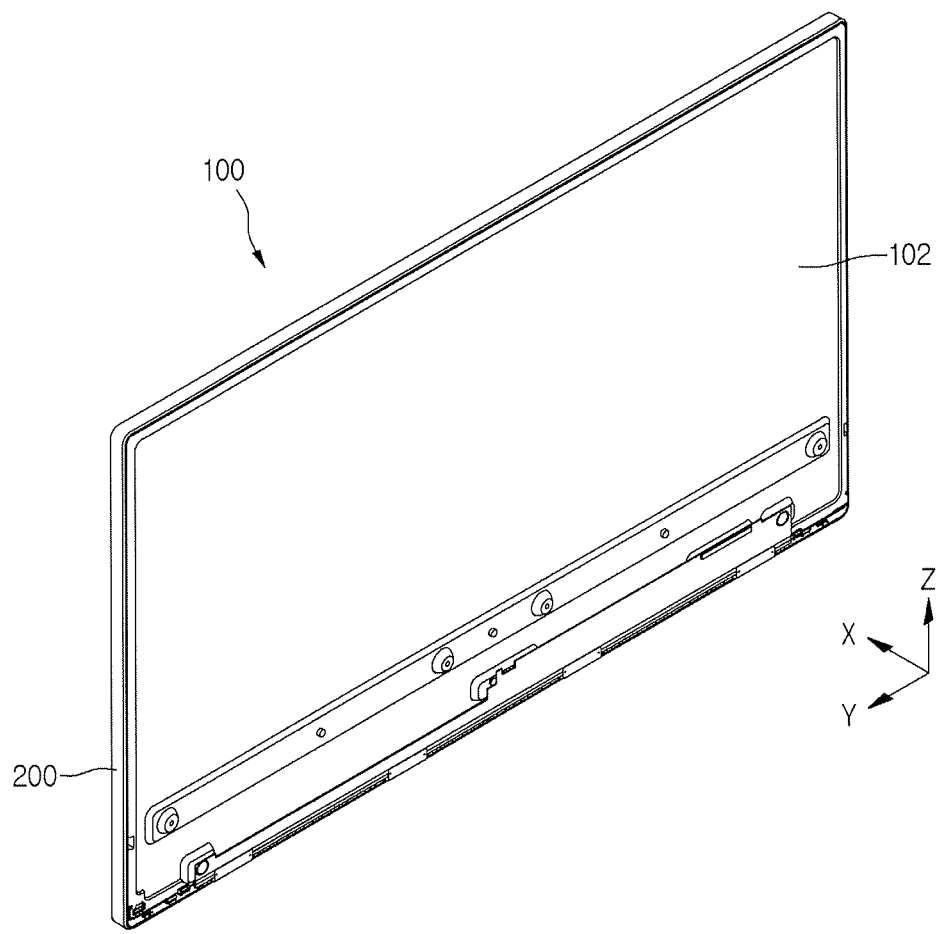
FIG. 16 is a rear perspective view of the bottom cover on which the cabinet of FIG. 9 is mounted.
Figure 17:
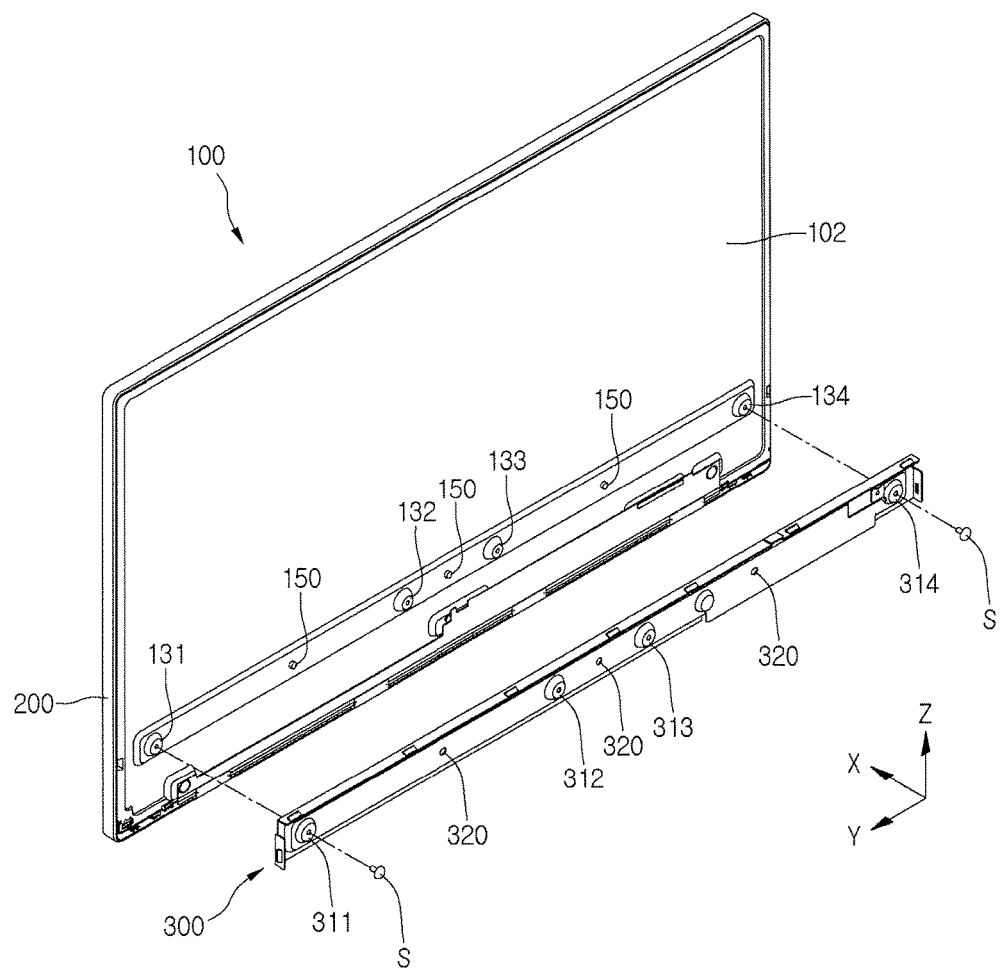
FIGS. 17 and 18 are views illustrating an assembly process of the bottom cover of FIG. 16 and a board support of FIG. 2.
Figure 18:
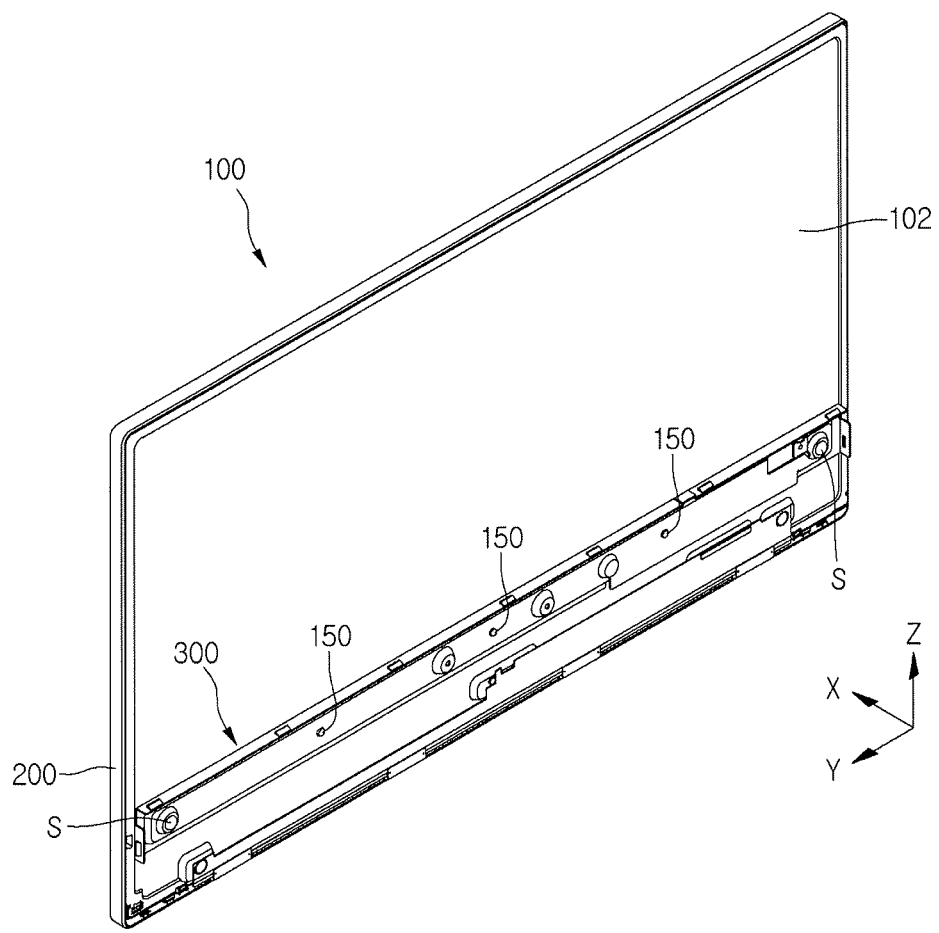
Figure 19:
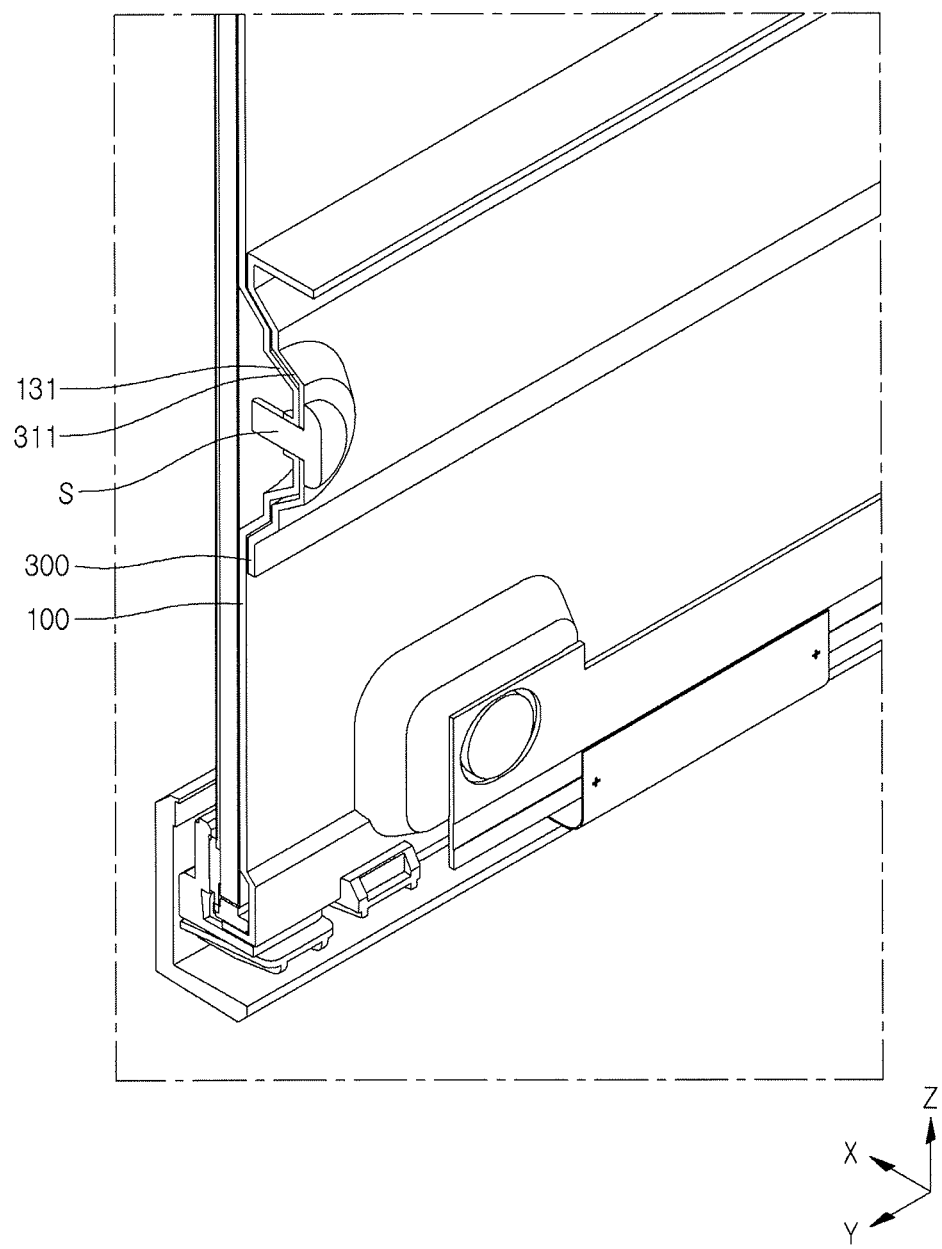
FIG. 19 is a view illustrating a coupled state of the bottom cover of FIG. 18 and a screw member of the board support.

FIG. 16 is a rear perspective view of the bottom cover on which the cabinet of FIG. 9 is mounted, FIGS. 17 and 18 are views illustrating an assembly process of the bottom cover of FIG. 16 and a board support of FIG. 2, and FIG. 19 is a view illustrating a coupled state of the bottom cover of FIG. 18 and the screw member of the board support.

Referring to FIGS. 16 to 19, the board support 300 is mounted on the bottom cover 100 on which the cabinet 200 is mounted. The mounting of the board support 300 on the bottom cover 100 may be performed through screw coupling using a screw member S. Hereinafter, constitutions of the bottom cover 100 and the board support 300 to be coupled to each other will be described.

The bottom cover 100 includes a plurality of screw holes 131, 132, 133, and 134 and a plurality of support ribs 150.

The plurality of screw holes 131, 132, 133, and 134 may be defined in a lower portion of the back surface 102 of the bottom cover 100 and spaced a predetermined distance from each other. Hereinafter, in the current embodiment, four screw holes 131, 132, 133, and 134 will be exemplified.

The plurality of support ribs 150 are disposed on a lower portion of the back surface 102 of the bottom cover 100 and are spaced a predetermined distance from each other. The support ribs 150 are disposed between the screw holes 131, 132, 133, and 134, respectively. Hereinafter, in the current embodiment, three support ribs 150 will be exemplified.

The board support 300 includes the plurality of screw holes 131, 132, 133, and 134 and a plurality of support holes 320.

The plurality of screw holes 131, 132, 133, and 134 are defined to be spaced a predetermined distance from each other along a longitudinal direction of the board support 300. Also, the plurality of screw holes may be defined to correspond to the plurality of screw holes 131, 132, 133, and 134 of the bottom cover 100 to realize the screw coupling of the screw member S. Hereinafter, in the current embodiment, four screw holes 311, 312, 313, and 314 will be exemplified.

The plurality of support holes 320 are defined to be spaced a predetermined distance from each other along a longitudinal direction of the board support 300 and are respectively defined between the screw holes 311, 312, 313, and 314. Hereinafter, in the current embodiment, three support holes 320 will be exemplified.

Hereinafter, the screw coupling between the bottom cover 100 including the above-described constitutions and the board support 300 will be described in detail.

The board support 300 is mounted on the back surface 102 of the bottom cover 100. Here, two screw members S may pass through the screw holes 311 and 314 defined in the vicinity of both ends of the board support 300 and the screw holes 131 and 134 defined in the vicinity of both ends of the back surface 102 of the bottom cover 100 and then be coupled.

In addition to the screw coupling, three support ribs 150 of the bottom cover 100 pass through three support holes 320 of the board support 300, respectively. Thus, the board support 300 may be more firmly fixed to and mounted on the bottom cover 100.

Figure 20:
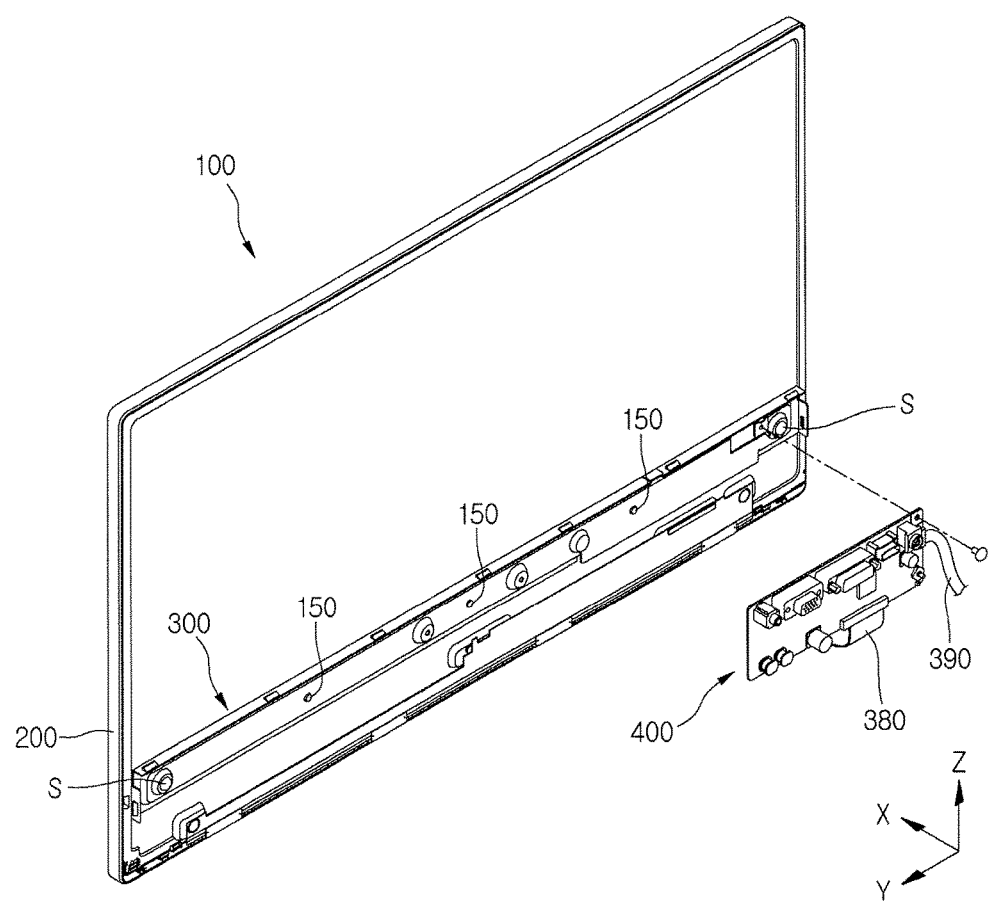
FIGS. 20 and 21 are views illustrating an assembly process of the bottom cover on which the board support of FIG. 18 is mounted and a main board of FIG. 2.
Figure 21:
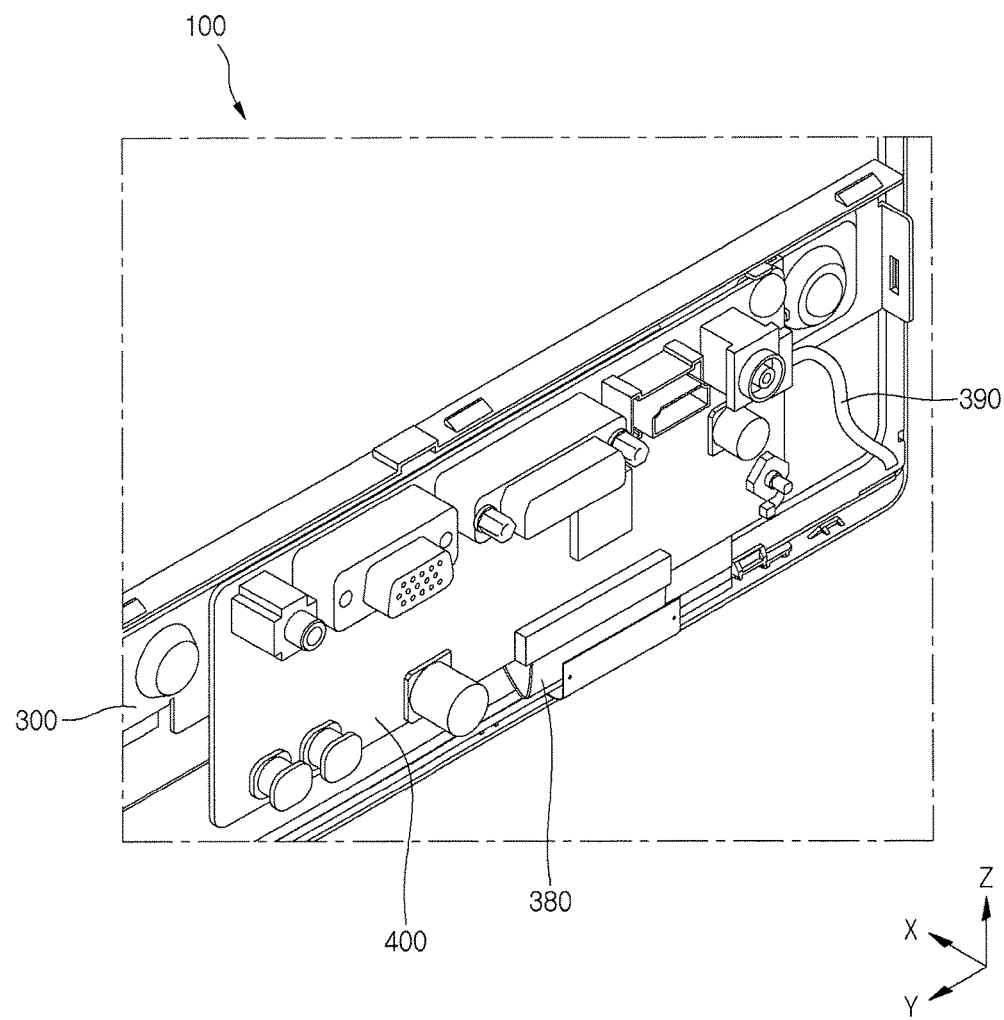

FIGS. 20 and 21 are views illustrating an assembly process of the bottom cover on which the board support of FIG. 18 is mounted and the main board of FIG. 2.

Referring to FIGS. 20 and 21, a main board 400 is mounted on the bottom cover 100 on which the board support 300 is mounted. Particularly, the main board 400 is mounted on the board support 300 through the screw member S.

A driving cable 380 electrically connected to the display panel 10 to drive the display panel 10 and a light source cable 390 electrically connected to the light source package 30 to drive the light source package 30 are mounted on the main board 400.

Figure 22:
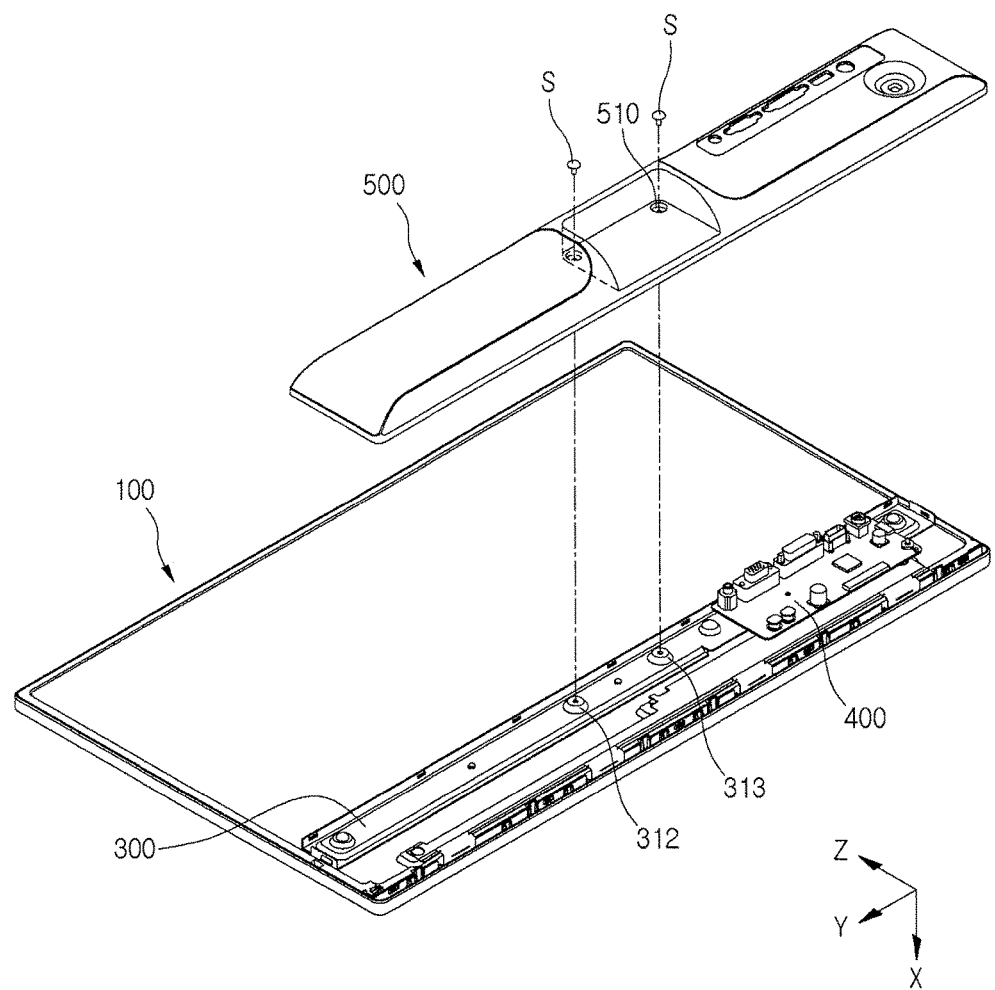
FIG. 22 is a view illustrating an assembly process of the bottom cover of FIG. 21 and a back cover of FIG. 2.
Figure 23:
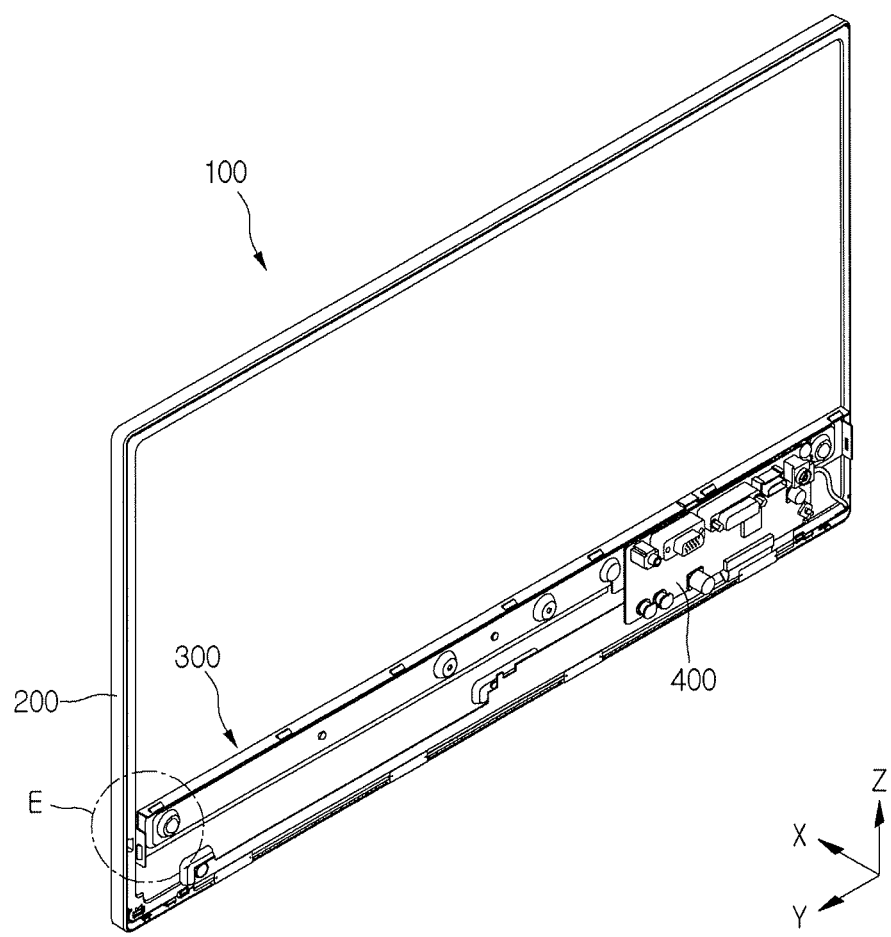
FIG. 23 is a view illustrating a main part of the bottom cover of FIG. 21.
Figure 24:
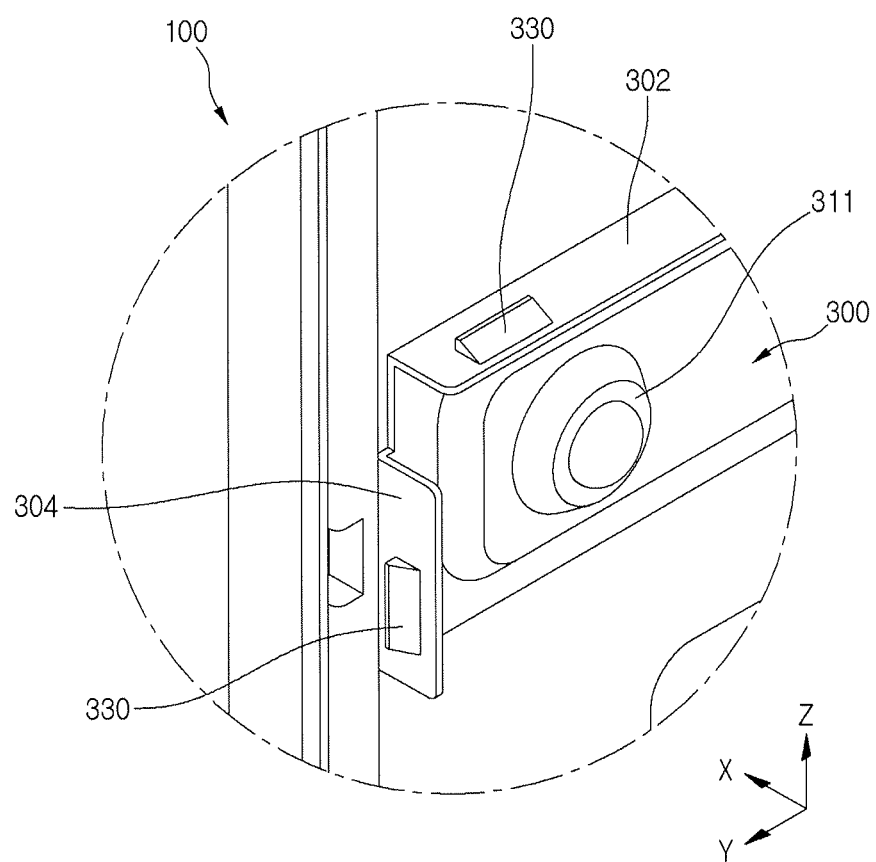
FIG. 24 is an enlarged view illustrating a portion "E" of the bottom cover of FIG. 23.
Figure 25:
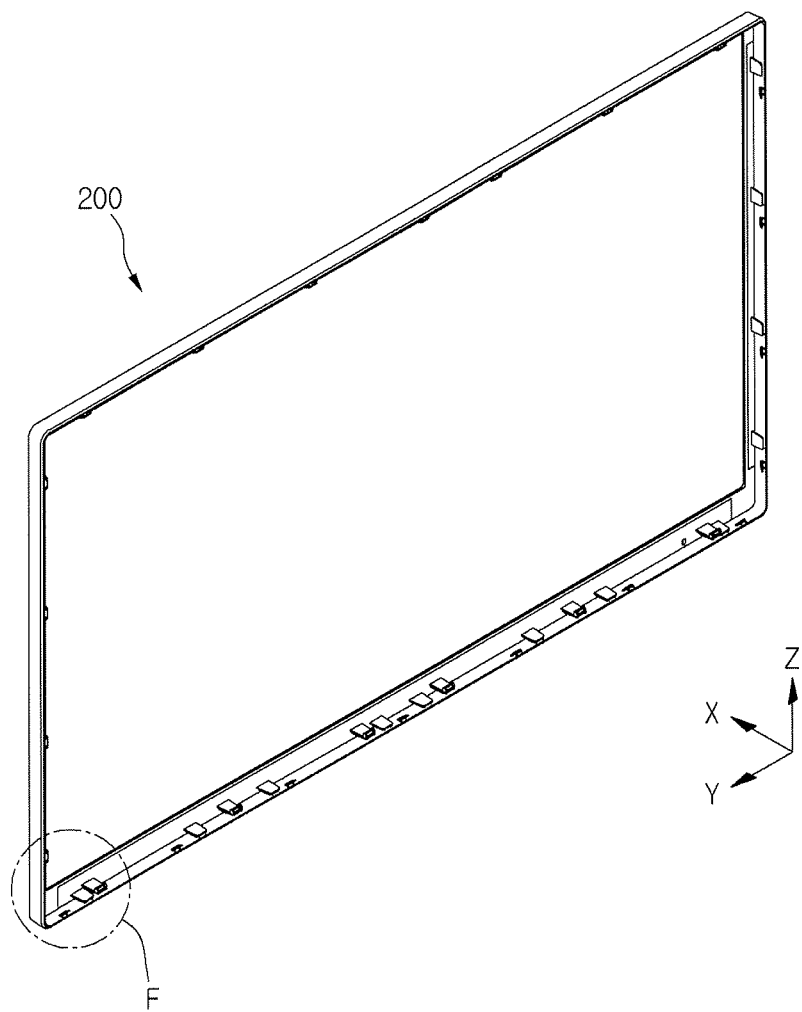
FIG. 25 is a rear perspective view of the cabinet of FIG. 2.
Figure 26:
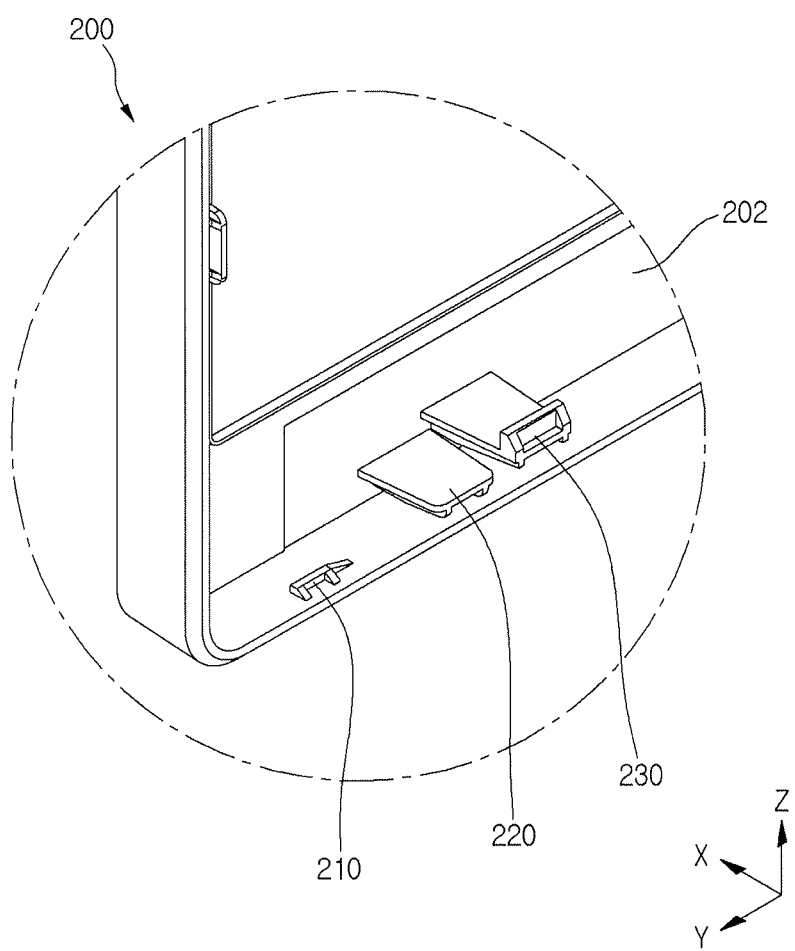
FIG. 26 is an enlarged view illustrating a portion "F" of the cabinet of FIG. 25.
Figure 27:
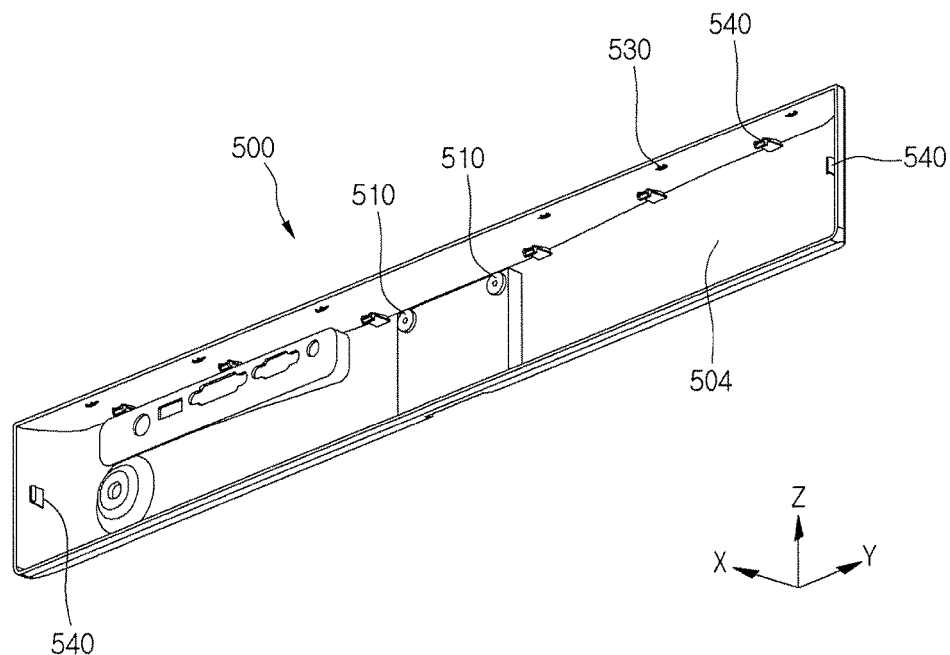
FIGS. 27 and 28 are perspective views of the back cover of FIG. 22.
Figure 28:
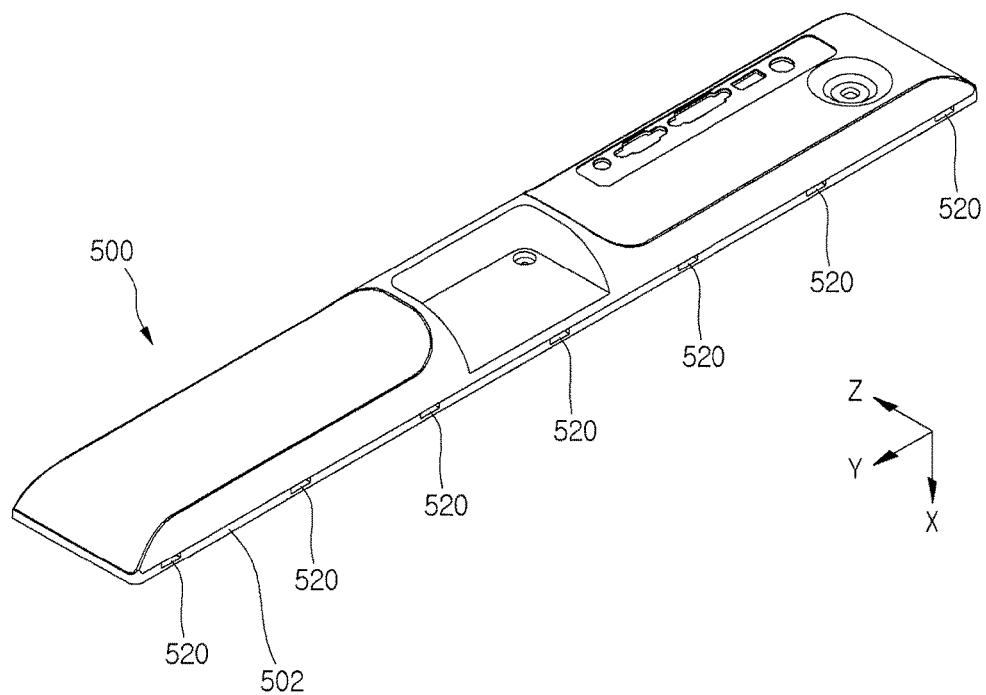
Figure 29:
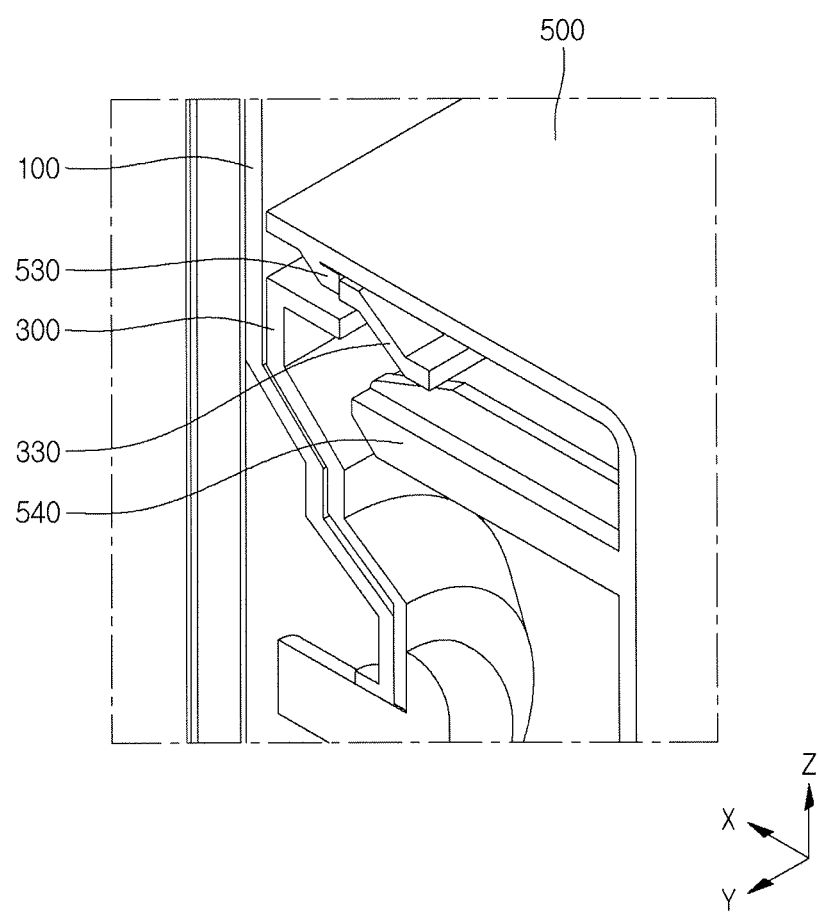
FIGS. 29 and 30 are views illustrating a main part when the bottom cover of FIG. 22 and the back cover are assembled with each other.
Figure 30:
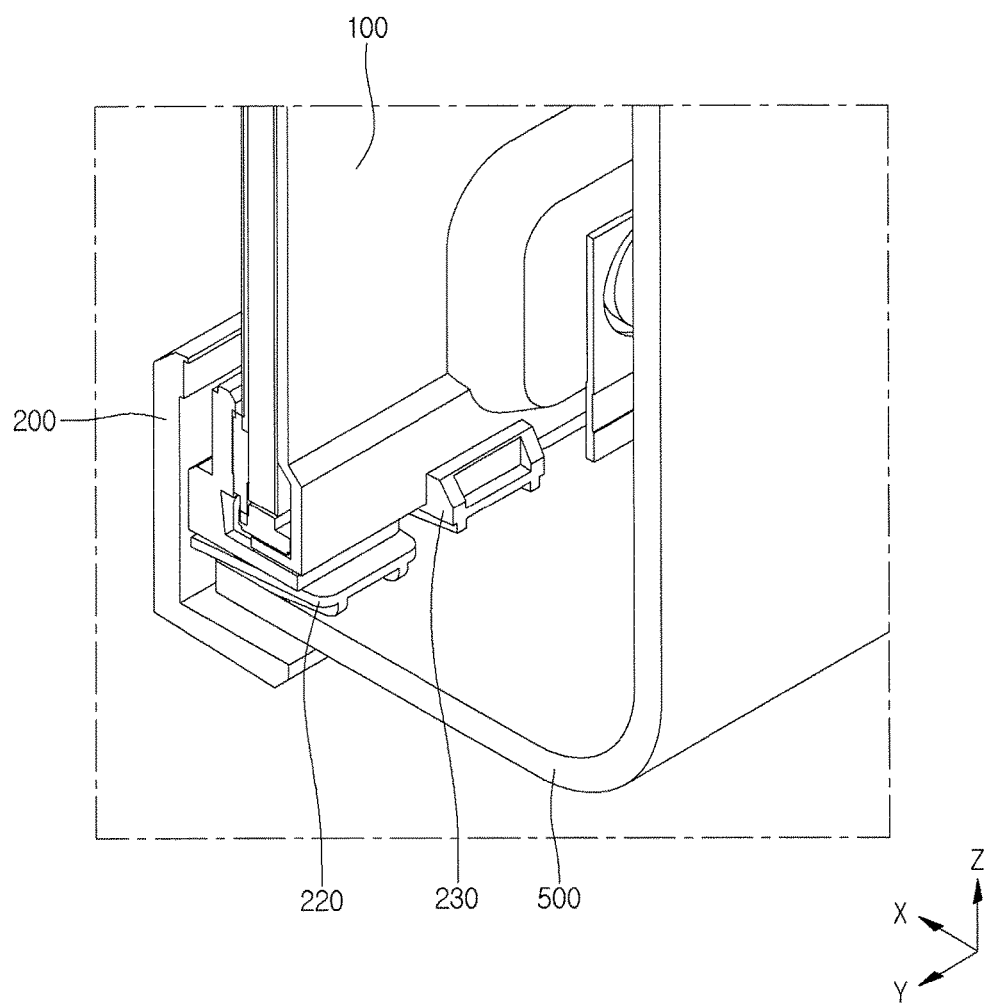
Figure 31:
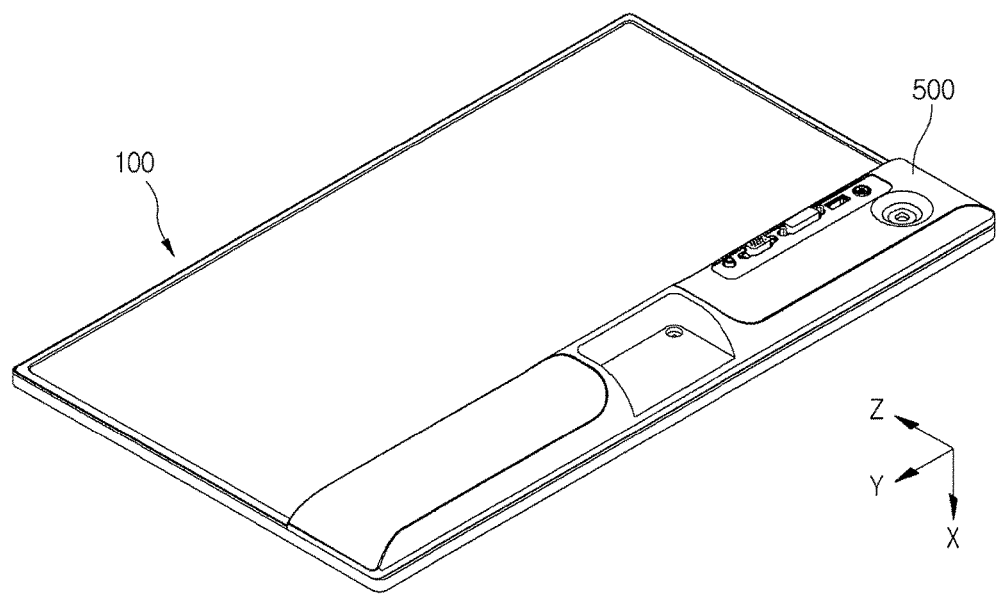
FIG. 31 is a perspective view of the bottom cover on which the back cover of FIG. 22 is mounted.

FIG. 22 is a view illustrating an assembly process of the bottom cover of FIG. 21 and the back cover of FIG. 2, FIG. 23 is a view illustrating a main part of the bottom cover of FIG. 21, FIG. 24 is an enlarged view illustrating a portion "E" of the bottom cover of FIG. 23, FIG. 25 is a rear perspective view of the cabinet of FIG. 2, FIG. 26 is an enlarged view illustrating a portion "F" of the cabinet of FIG. 25, FIGS. 27 and 28 are perspective views of the back cover of FIG. 22, FIGS. 29 and 30 are views illustrating a main part when the bottom cover of FIG. 22 and the back cover are assembled with each other, and FIG. 31 is a perspective view of the bottom cover on which the back cover of FIG. 22 is mounted.

Referring to FIGS. 22 to 31, the back cover 500 is mounted on the bottom cover 100 on which the main board 400 is mounted. Here, the back cover 500 is mounted on the bottom cover 100 through the hook coupling in addition to the screw coupling using the screw member S. Hereinafter, constitutions of the cabinet 200, the board support 300, and the back cover 500 for performing the above-described coupling processes will be described.

The cabinet 200 further includes a latch rib 230 in addition to the above-described constitutions.

The latch rib 230 protrudes downward from the back surface 202 of the cabinet 200 and is provided in a pair. The latch ribs 230 are spaced a predetermined distance from each other and fitted into the bottom cover 100. That is, the cabinet 200 is latch-coupled to the bottom cover 100 through the latch rib 230. Thus, the bottom cover 100 and the cabinet 200 may be more firmly coupled to each other. Furthermore, the fitting ribs 220 protruding downward from the back surface 202 of the cabinet 200 are fitted into the back cover 200.

The board support 300 further includes a hook mount in addition to the above-described constitutions.

The hook mount 330 hook-couples the board support 300 to the back cover 500 and is provided in plurality. The plurality of hook mounts 330 are disposed on a top surface 302 and both side surfaces 304 of the board support 300. The plurality of hook mounts 330 disposed on the top surface 302 of the board support 300 are spaced a predetermined distance from each other.

The back cover 500 includes a plurality of screw holes 510, a latch hole 520, a hook protrusion 530, and a back cover rib 540.

The screw members S passes through the plurality of screw holes 510, and two screw members S are provided. The screw members S respectively passing through the screw holes 510 respectively pass through the screw holes 312 and 313 of the board support 300 and the screw holes 132 and 133 of the bottom cover 100 to screw-couple the bottom cover 100 to the back cover 500.

The latch hole 520 is defined in a bottom surface 502 of the back cover 500 and is provided in plurality. The plurality of latch holes 520 are spaced a predetermined distance from each other, and the latch protrusions 210 disposed on the lower edge of the cabinet 200 are inserted into and mounted on the plurality of latch holes 520. Thus, the cabinet 200 may be hook-coupled to the back cover 500.

The hook protrusion 530 is hook-coupled to the board support 300 and is provided in plurality. The plurality of hook protrusions 530 are spaced a predetermined distance from each other along an upper edge of the back cover 500. The plurality of hook protrusions 530 is hook-coupled to the hook mounts 330 of the board support 300, respectively. Thus, the back cover 500 may be hook-coupled to the board support 300.

The back cover rib 540 is spaced a predetermined distance from the edge of the back cover 500 to protrude from a front surface 504 of the back cover 500. The plurality of back cover ribs 540 are spaced a predetermined distance from each other along the edge of the back cover 500 and then are fitted into the board support 300.

Among the plurality of back cover ribs 540, the back cover ribs 540 disposed on both sides of the front surface 504 of the back cover 500 are hook-coupled to the hook mounts 330 disposed on both side surfaces 304 of the board support 300.

As described above, in the current embodiment, since the back cover 500 is hook-coupled to the bottom cover 100, a smaller number of screw members S, i.e., the two screw members S, may be used.

Thus, the display apparatus (see reference numeral 1 of FIG. 1) according to the current embodiment may be improved in assembly process efficiency and reduced in manufacturing cost.

Also, the display apparatus 1 according to the current embodiment may be significantly reduced in the number of components required for assembling by the modification in component assembly structure. Therefore, the display apparatus 1 may be reduced in width of a bezel.

Thus, the display apparatus 1 according to the current embodiment may realize the slimmer display apparatus 1 according to the trend of the slimness in recent years.

Figure 32:
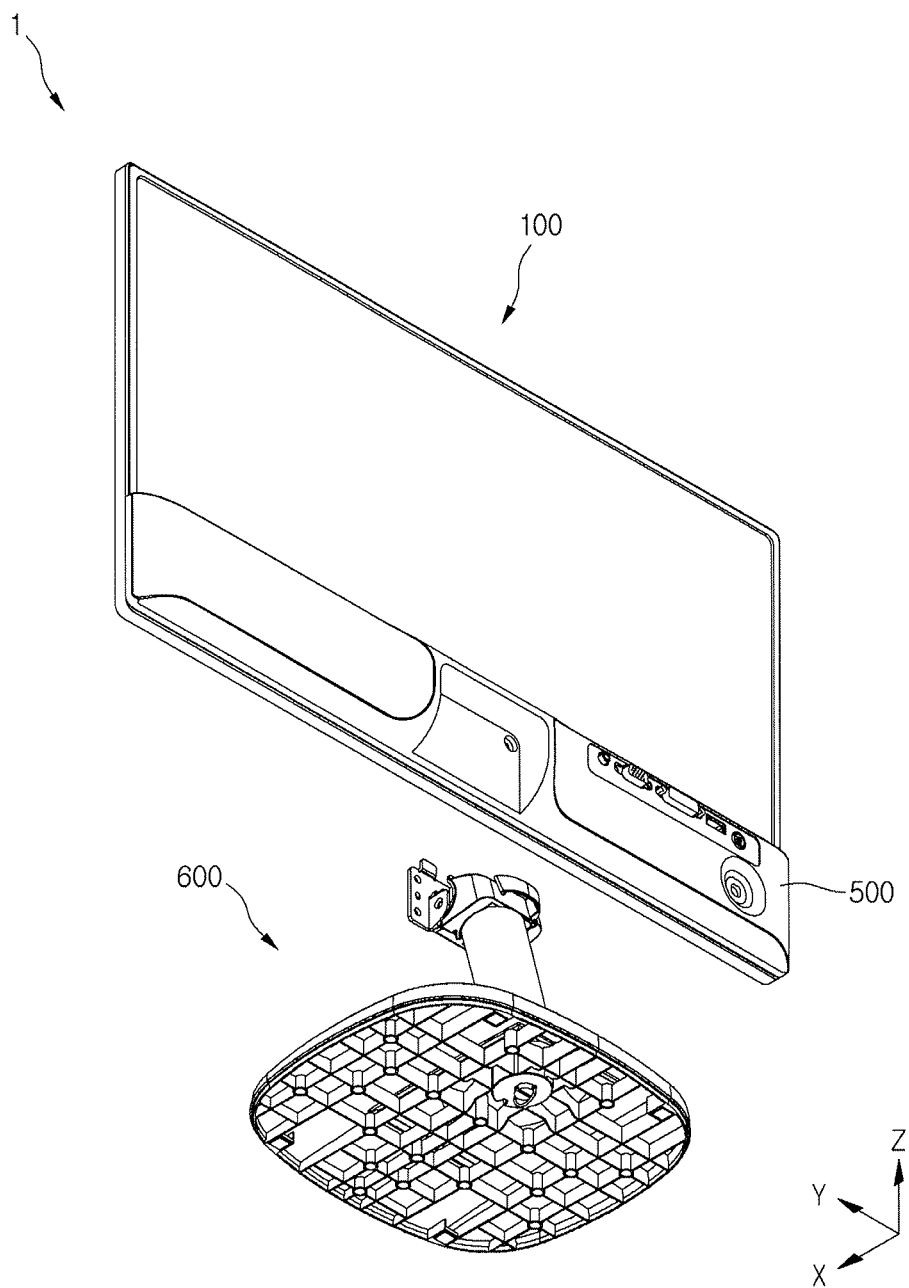
FIG. 32 is a view illustrating an assembly process of the bottom cover of FIG. 31 and a stand of FIG. 2.

FIG. 32 is a view illustrating an assembly process of the bottom cover of FIG. 31 and a stand of FIG. 2.

Referring to FIG. 32, the display apparatus 1 may be completely assembled by coupling the stand 600 to the bottom cover on which the back cover 500 is mounted. The coupling of the stand 600 may be performed by an individual user. That is, in the current embodiment, the display apparatus 1 except for the stand 600 can be sold, and then the user can finally couple the stand 600 to the display apparatus 1.

Therefore, the display apparatus 1 according to the current embodiment may be reduced in volume occupied for packaging the product when the product is sold.

According the various embodiments as described above, the display apparatus having the simple structure that is capable of improving the assembly process efficiency and reducing the manufacturing costs may be provided.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A display apparatus comprising:
a display panel to display an image;
a cabinet covering a front edge portion of the display panel;
a light source package disposed on a rear side of the display panel to provide light onto the display panel;
a bottom cover disposed on a rear side of the light source package, the bottom cover being coupled to the cabinet to package the display panel and the light source package; and
a back cover covering a first portion of a rear side of the bottom cover.

2. The display apparatus according to claim 1, further comprising a board support mounted on the first portion of the rear side of the bottom cover,
wherein the back cover covers the board support and includes a plurality of first couplers, and the board support includes a plurality of second couplers to be coupled with the plurality of first couplers.

3. The display apparatus according to claim 2, wherein the plurality of first couplers include at least one hook protrusion, and
wherein the plurality of second couplers include at least one hook mount hook-coupled to the at least one hook protrusion.

4. The display apparatus according to claim 3, wherein the at least one hook mount includes a plurality of hook mounts placed at a top surface and side surfaces of the board support.

5. The display apparatus according to claim 2, wherein the plurality of first couplers include at least one back cover rib protruding from a front surface of the back cover so as to be fitted into the board support disposed on the back cover.

6. The display apparatus according to claim 5, wherein the at least one back cover rib includes a plurality of back cover ribs placed at an upper edge and both side edges of the back cover so as to be coupled with a top surface and side surfaces of the board support.

7. The display apparatus according to claim 2, wherein a main board is disposed on a rear side of the board support and is covered by the back cover.

8. The display apparatus according to claim 2, wherein the plurality of first couplers further comprises at least one first latch coupling portion at a bottom side of the back cover, and
wherein the cabinet includes at least one first latch protrusion disposed on a lower edge of the cabinet hook-coupled to the at least one first latch coupling portion.

9. The display apparatus according to claim 1, wherein the cabinet includes at least one first fitting rib protruding from a back surface of a front part at a lower portion of the cabinet, and
wherein a lower edge of the back cover is fitted in-between the at least one first fitting rib of the cabinet and a side part of the cabinet at a lower part of the display apparatus.

10. The display apparatus according to claim 1, wherein the cabinet includes at least one latch rib protrudes from a back surface of a front part of the cabinet, the at least one latch rib latch-coupled to the bottom cover.

11. The display apparatus according to claim 10, wherein an upper surface of the at least one latch rib contacts a bottom surface of the bottom cover.

12. The display apparatus according to claim 11, further comprising:
a flexible printed circuit board extending into a space under the bottom surface of the bottom cover in an area adjacent to the at least one latch rib.

13. The display apparatus according to claim 9, further comprising a plurality of second fitting ribs protruding from the front part of the back surface of the cabinet at an upper portion and both side portions and the plurality of second fitting ribs are fitted into the bottom cover.

14. The display apparatus according to claim 1, wherein the cabinet includes at least one second latch protrusion protruding from a side part of the cabinet, and
wherein the bottom cover includes at least one second latch coupling portion coupled with the at least one second latch protrusion of the cabinet.

15. The display apparatus according to claim 14, wherein the at least one second latch protrusion includes a plurality of second latch protrusions spaced a predetermined distance from each other along an edge of the cabinet, and
wherein the at least one second latch coupling portion of the bottom cover includes a plurality of second latch coupling portions to correspond to the plurality of second latch protrusions disposed on an upper edge and both side edges of the cabinet.

16. The display apparatus according to claim 14, wherein a plurality of latch guide slops or a plurality of latch guide grooves in front of a plurality of second latch coupling portions guide insertion of the plurality of second latch protrusions.

17. The display apparatus according to claim 1, further comprising a panel guide for guiding mounting of the display panel on the bottom cover,
wherein at least a portion of the cabinet is exposed to an outside of the display apparatus, and at least a portion of the cabinet contacts with the panel guide.

18. The display apparatus according to claim 16, wherein an upper portion of the panel guide and a side portion of the panel guide are inserted into an inner surface of the bottom cover.

* * * * *